United States Patent
Takashima et al.

(10) Patent No.: US 9,288,363 B2
(45) Date of Patent: Mar. 15, 2016

(54) IMAGE-PROCESSING APPARATUS

(71) Applicant: Sharp Kabushiki Kaisha, Osaka-shi, Osaka (JP)

(72) Inventors: Masahiko Takashima, Osaka (JP); Toyohisa Matsuda, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 12 days.

(21) Appl. No.: 14/437,574

(22) PCT Filed: Oct. 15, 2013

(86) PCT No.: PCT/JP2013/077964
§ 371 (c)(1),
(2) Date: Apr. 22, 2015

(87) PCT Pub. No.: WO2014/065160
PCT Pub. Date: May 1, 2014

(65) Prior Publication Data
US 2015/0288851 A1    Oct. 8, 2015

(30) Foreign Application Priority Data
Oct. 24, 2012   (JP) .................................. 2012-235168

(51) Int. Cl.
| | |
|---|---|
| G06K 9/32 | (2006.01) |
| H04N 1/393 | (2006.01) |
| H04N 5/14 | (2006.01) |
| G06T 3/40 | (2006.01) |
| H04N 7/01 | (2006.01) |

(52) U.S. Cl.
CPC .............. *H04N 1/393* (2013.01); *G06T 3/4007* (2013.01); *H04N 5/142* (2013.01); *H04N 7/0142* (2013.01)

(58) Field of Classification Search
None
See application file for complete search history.

(56) References Cited

U.S. PATENT DOCUMENTS

| | | | |
|---|---|---|---|
| 2010/0067818 A1 | 3/2010 | Zhang et al. | |
| 2011/0187934 A1* | 8/2011 | Pan et al. ...................... | 348/625 |

FOREIGN PATENT DOCUMENTS

| | | |
|---|---|---|
| JP | 2010-067272 A | 3/2010 |
| JP | 2012-124598 A | 6/2012 |

* cited by examiner

*Primary Examiner* — Andrew Moyer
(74) *Attorney, Agent, or Firm* — Keating & Bennett, LLP

(57) ABSTRACT

A television receiver includes: an edge gradient direction setting section configured to set an edge gradient direction of an interpolation pixel by use of input pixels within a reference block; a temporary reference coordinate setting section (65) configured to set four reference pixels to be vertices of a parallelogram having two sides perpendicular to the edge gradient direction; a reference pixel value setting section (66) configured to set, by use of the input pixels within the reference block regardless of whether a first reference pixel and/or a second reference pixel of the four reference pixels is/are located inside or outside the reference block, reference pixel values which are pixel values of the respective four reference pixels; and an interpolation pixel value calculating section (67) configured to calculate a pixel value of the interpolation pixel by use of the reference pixel values of the respective four reference pixels.

10 Claims, 38 Drawing Sheets

F I G. 5

HORIZONTAL DIRECTION

| -1 | 0 | +1 |
|---|---|---|
| -a | 0 | +a |
| -1 | 0 | +1 |

VERTICAL DIRECTION

| -1 | -a | -1 |
|---|---|---|
| 0 | 0 | 0 |
| +1 | +a | +1 |

F I G. 6
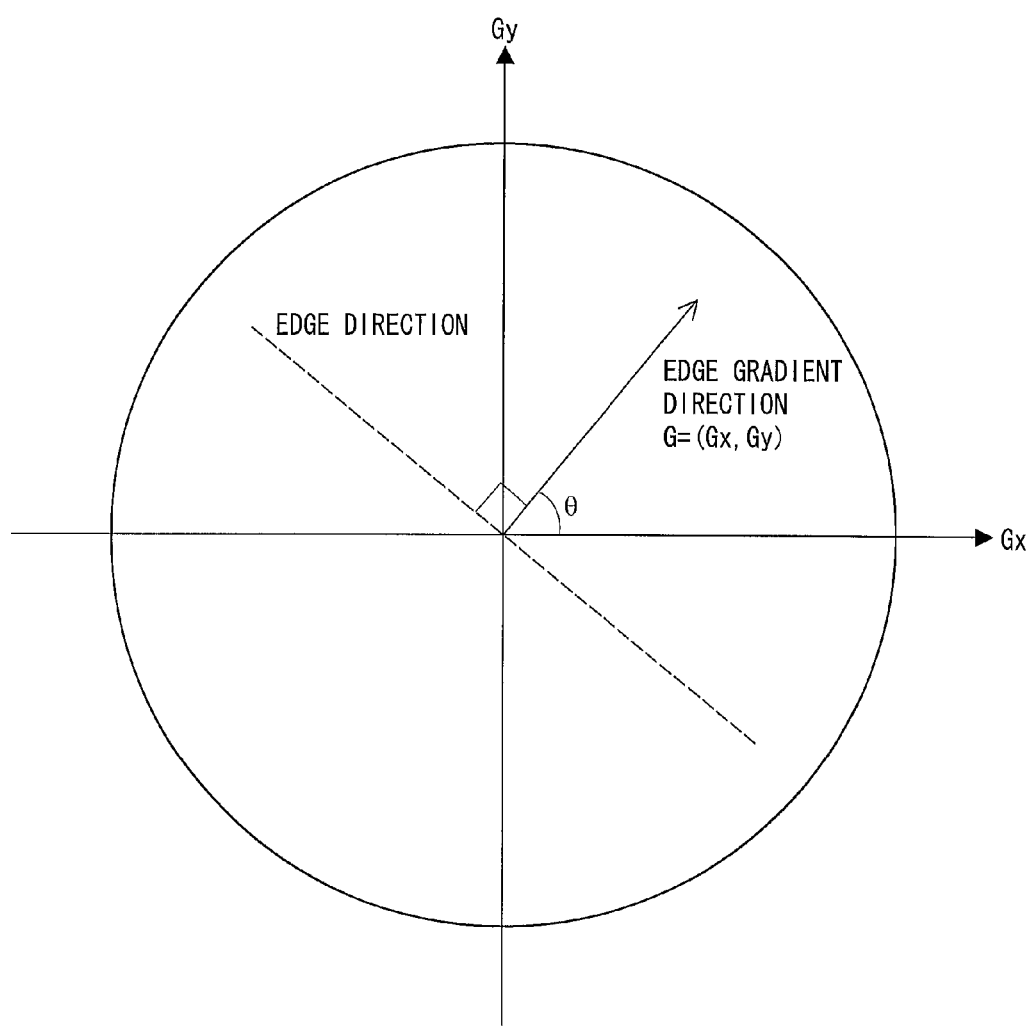

F I G. 7
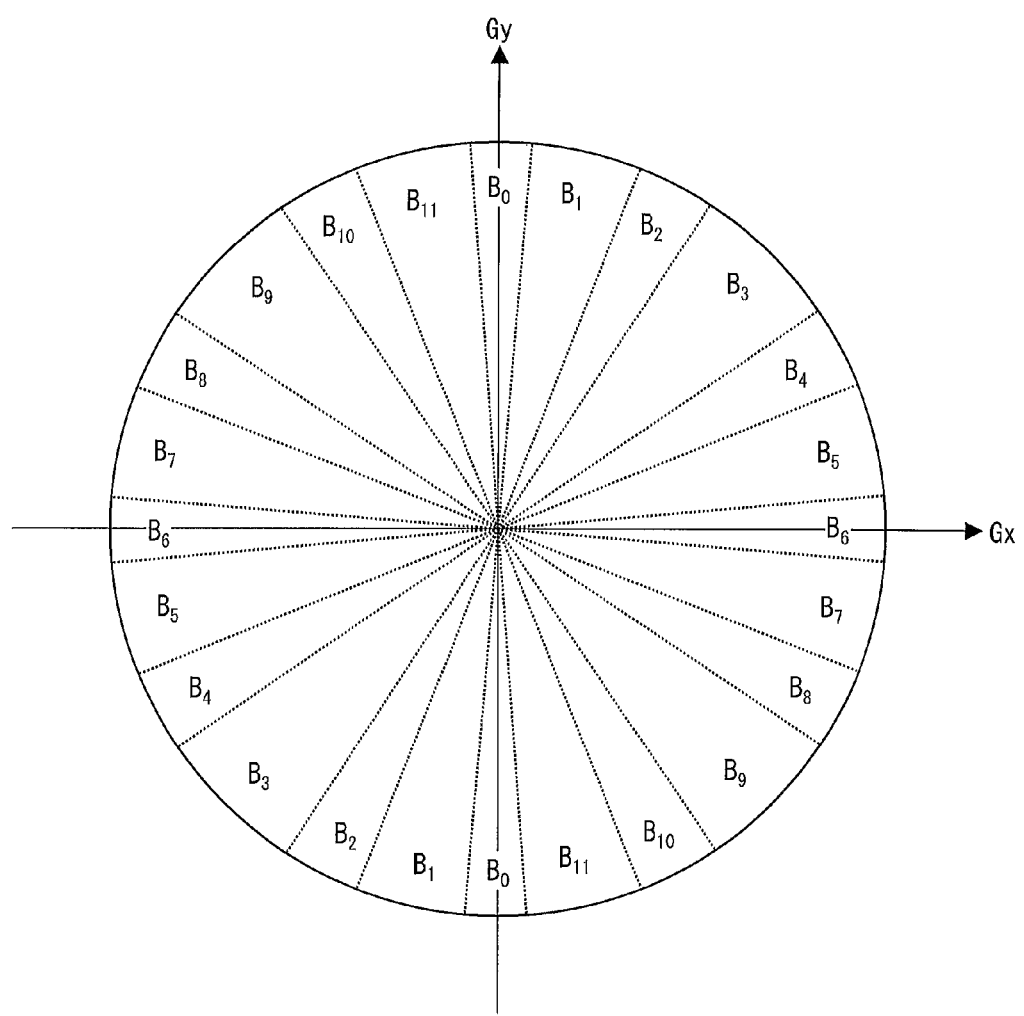

F I G. 1 5
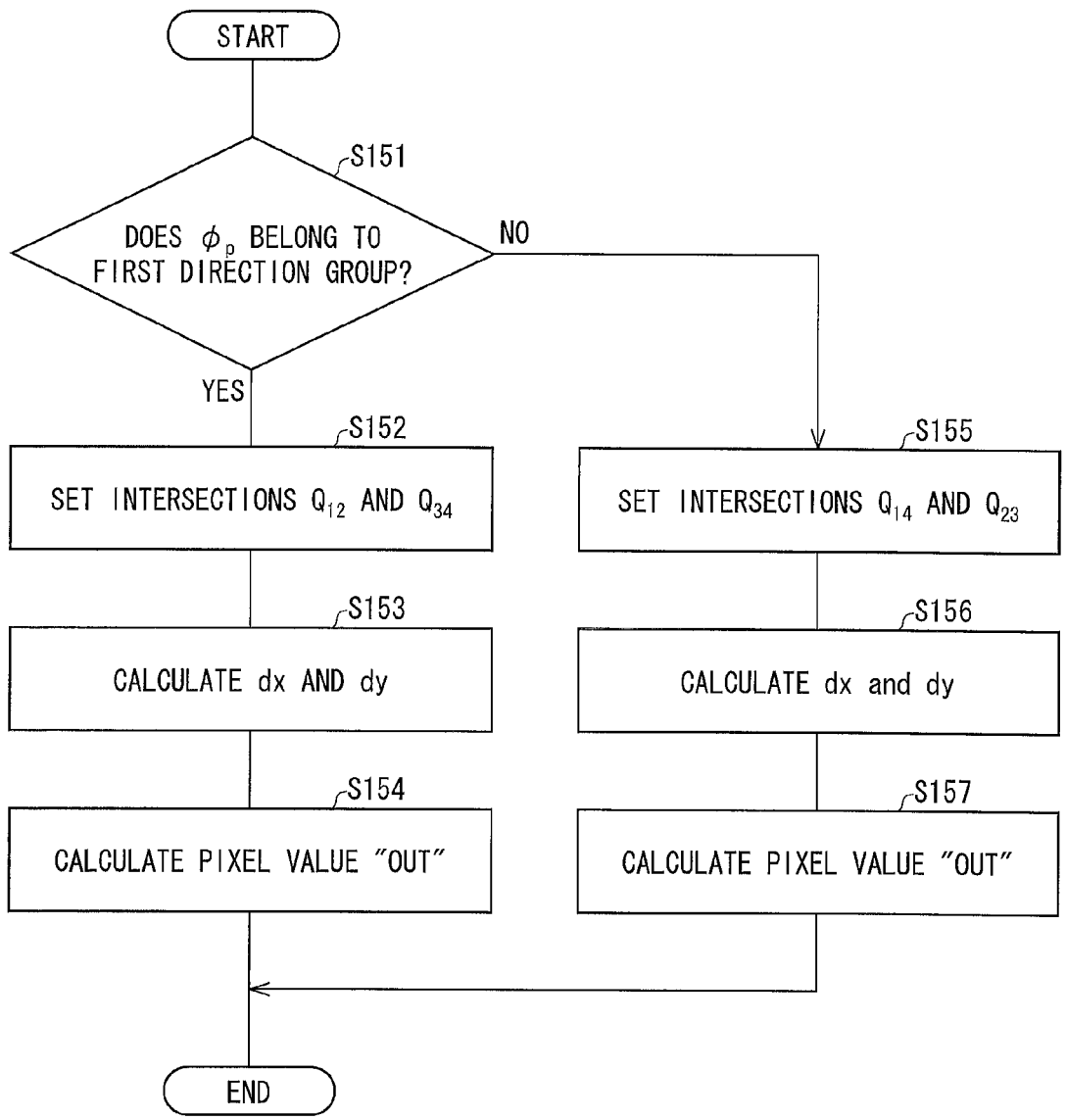

| -1 | 0 | +1 |
|---|---|---|
| -a | 0 | +a |
| -1 | 0 | +1 |

(b) $F_{V1}$

| -1 | -a | -1 |
|---|---|---|
| 0 | 0 | 0 |
| +1 | +a | +1 |

(c) $F_{H2}$

| 0 | -1 | +1 |
|---|---|---|
| 0 | -a | +a |
| 0 | -1 | +1 |

(d) $F_{V2}$

| 0 | 0 | 0 |
|---|---|---|
| -1 | -a | -1 |
| +1 | +a | +1 |

(e) $F_{H3}$

| -1 | +1 | 0 |
|---|---|---|
| -a | +a | 0 |
| -1 | +1 | 0 |

(f) $F_{V3}$

| -1 | -a | -1 |
|---|---|---|
| +1 | +a | +1 |
| 0 | 0 | 0 |

F I G. 1 9
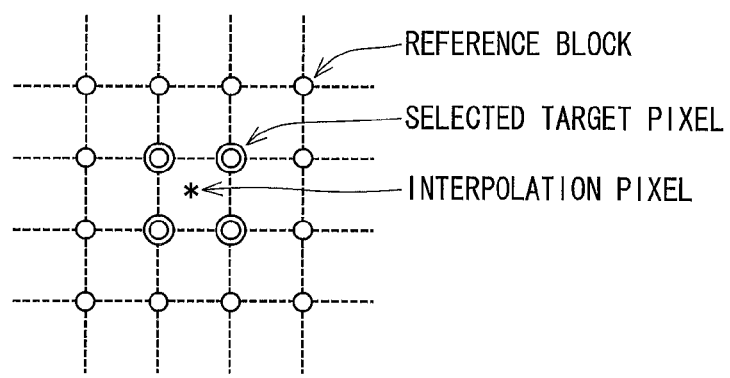

F I G. 2 2
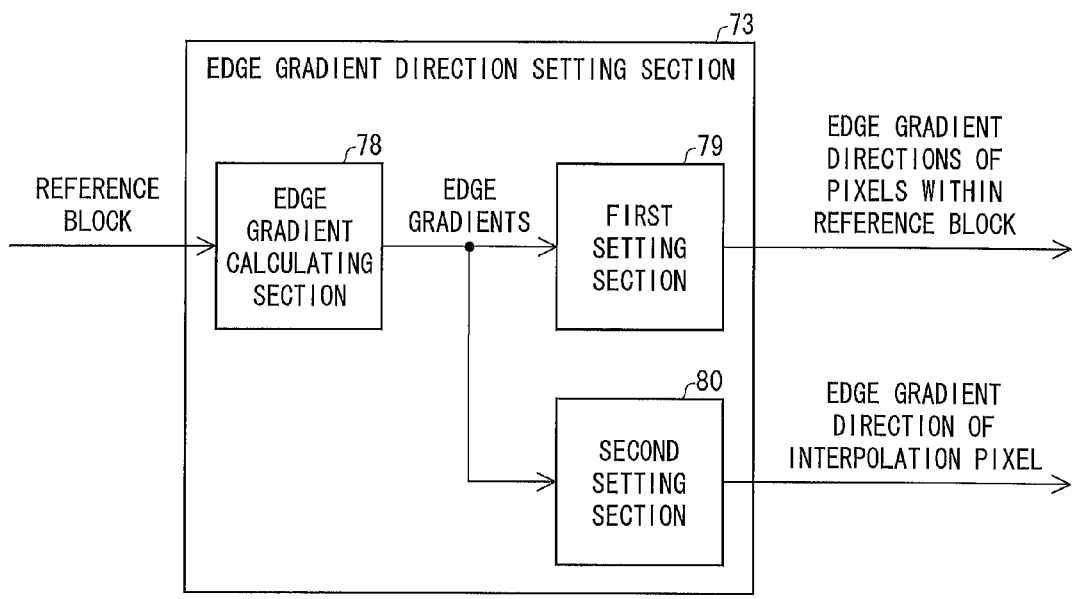

F I G. 2 4

| LUT_C[$\phi$] | |
|---|---|
| INPUT VALUE $\phi$ | OUTPUT VALUE |
| $B_0$ | 8 |
| $B_1$ | 8 |
| $B_2$ | 8 |
| $B_3$ | 8 |
| $B_4$ | 8 |
| $B_5$ | 8 |
| $B_6$ | 8 |
| $B_7$ | 8 |
| $B_8$ | 8 |
| $B_9$ | 8 |
| $B_{10}$ | 8 |
| $B_{11}$ | 8 |

F I G. 2 5
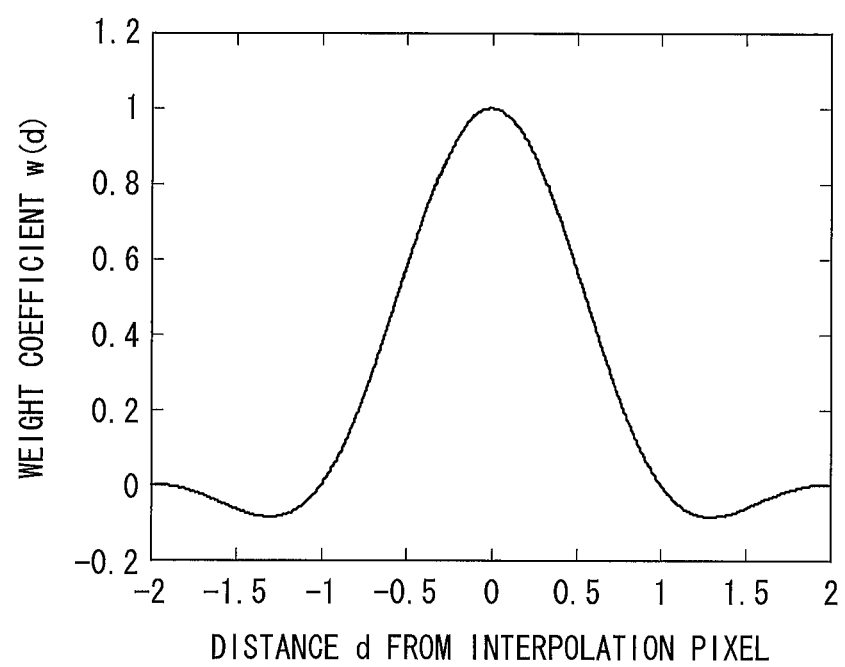

FIG. 27

(a) LUT_C[$\phi$]

| INPUT VALUE $\phi$ | OUTPUT VALUE |
|---|---|
| $B_0$ | 8 |
| $B_1$ | 8 |
| $B_2$ | 8 |
| $B_3$ | 8 |
| $B_4$ | 8 |
| $B_5$ | 8 |
| $B_6$ | 8 |
| $B_7$ | 8 |
| $B_8$ | 8 |
| $B_9$ | 8 |
| $B_{10}$ | 8 |
| $B_{11}$ | 8 |

(b) LUT_R[$\phi$]

| INPUT VALUE $\phi$ | OUTPUT VALUE |
|---|---|
| $B_0$ | 0 |
| $B_1$ | 3 |
| $B_2$ | 3 |
| $B_3$ | 3 |
| $B_4$ | 3 |
| $B_5$ | 0 |
| $B_6$ | 0 |
| $B_7$ | 3 |
| $B_8$ | 3 |
| $B_9$ | 3 |
| $B_{10}$ | 3 |
| $B_{11}$ | 0 |

(c) LUT_L[$\phi$]

| INPUT VALUE $\phi$ | OUTPUT VALUE |
|---|---|
| $B_0$ | 0 |
| $B_1$ | 0 |
| $B_2$ | 3 |
| $B_3$ | 3 |
| $B_4$ | 3 |
| $B_5$ | 3 |
| $B_6$ | 0 |
| $B_7$ | 0 |
| $B_8$ | 3 |
| $B_9$ | 3 |
| $B_{10}$ | 3 |
| $B_{11}$ | 3 |

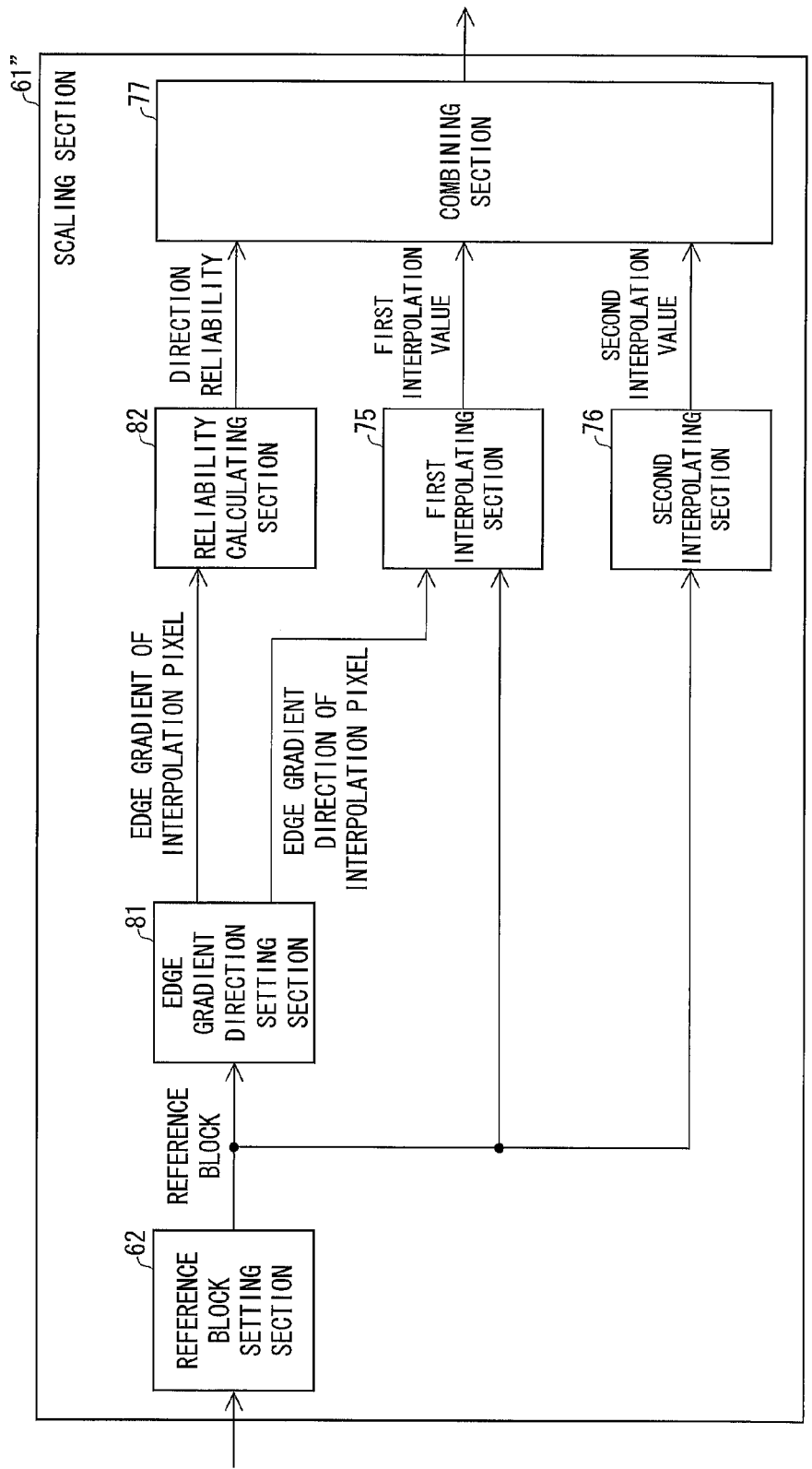
F I G. 28

F I G. 29
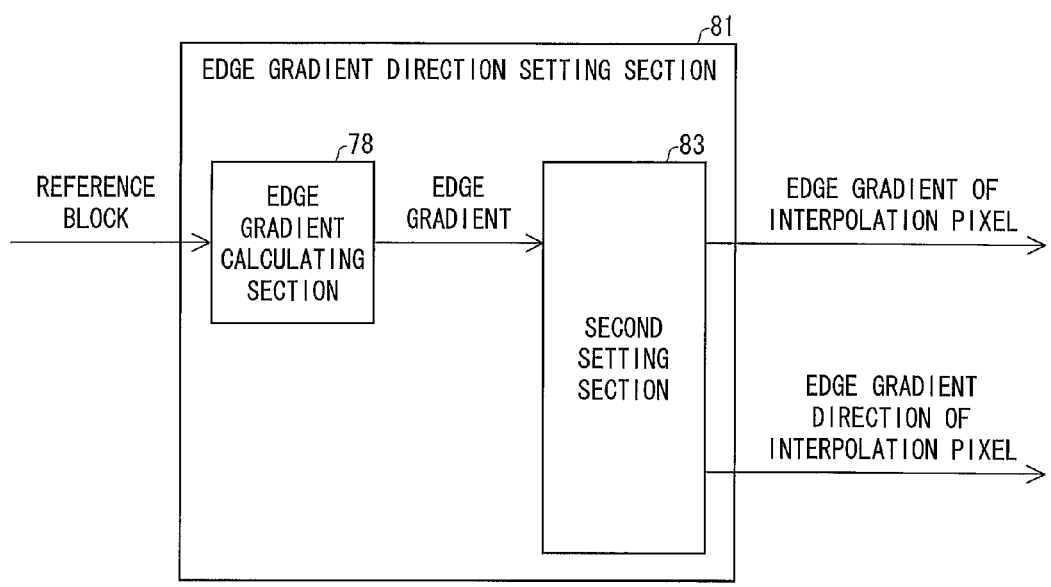

F I G. 3 0
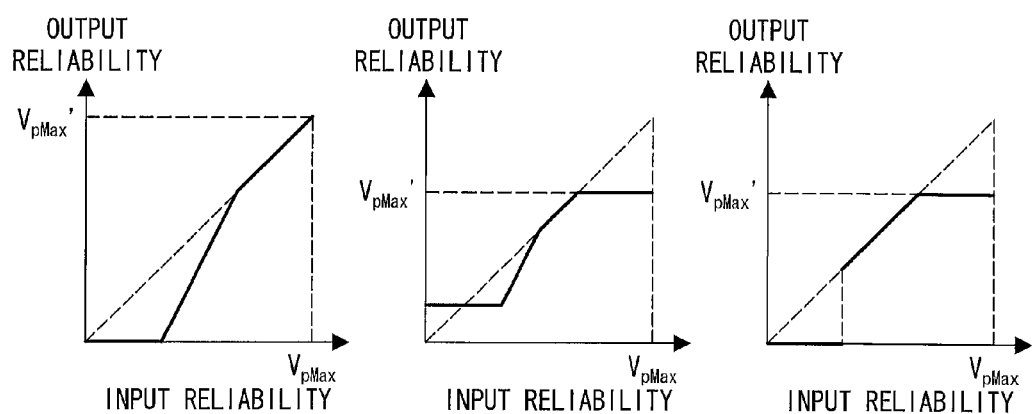

FIG. 32

| INPUT VALUE $\phi$ | OUTPUT VALUE |
|---|---|
| $B_0$ | 10 |
| $B_1$ | 5 |
| $B_2$ | 7 |
| $B_3$ | 4 |
| $B_4$ | 7 |
| $B_5$ | 5 |
| $B_6$ | 10 |
| $B_7$ | 5 |
| $B_8$ | 7 |
| $B_9$ | 6 |
| $B_{10}$ | 7 |
| $B_{11}$ | 5 |

F I G. 3 3
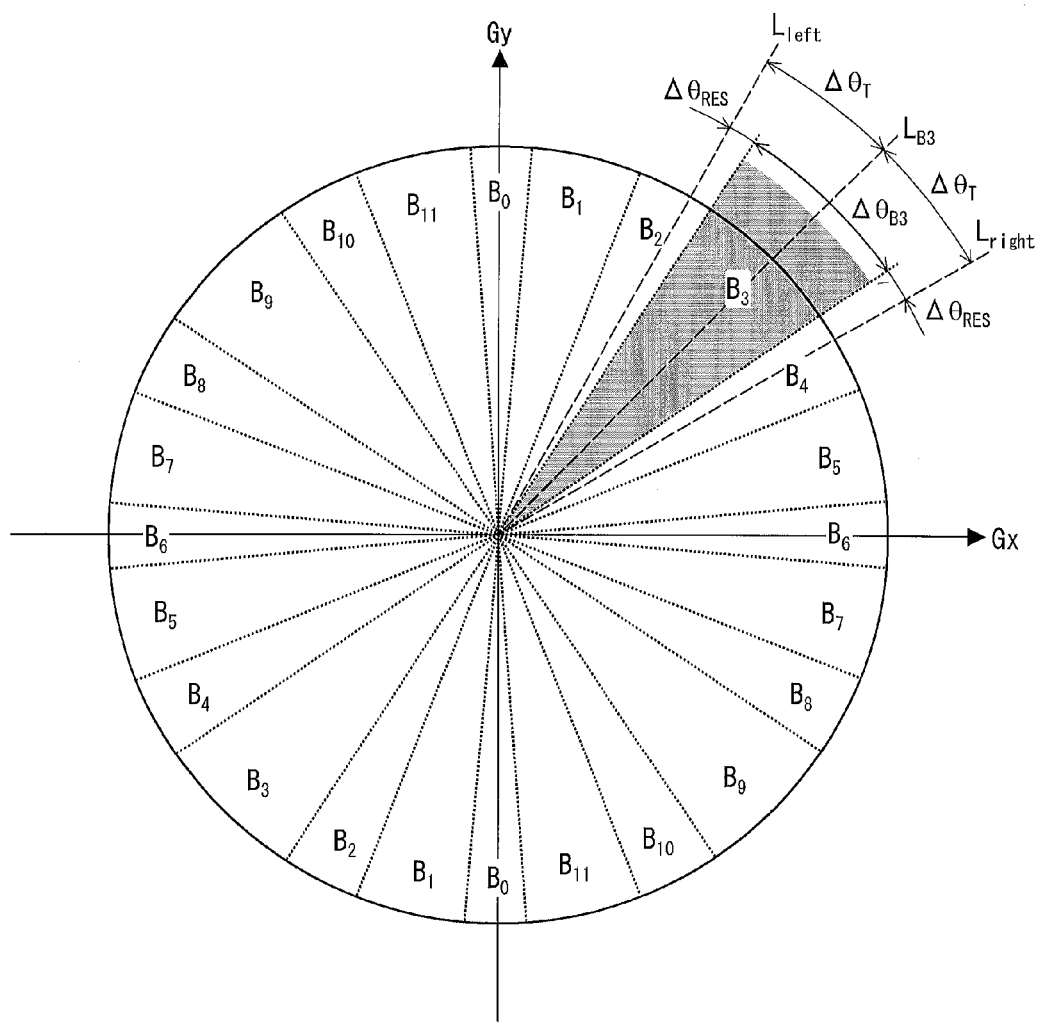

F I G. 3 4

(a) LUT_C[φ]

| INPUT VALUE φ | OUTPUT VALUE |
|---|---|
| $B_0$ | 10 |
| $B_1$ | 5 |
| $B_2$ | 7 |
| $B_3$ | 4 |
| $B_4$ | 7 |
| $B_5$ | 5 |
| $B_6$ | 10 |
| $B_7$ | 5 |
| $B_8$ | 7 |
| $B_9$ | 6 |
| $B_{10}$ | 7 |
| $B_{11}$ | 5 |

(b) LUT_R[φ]

| INPUT VALUE φ | OUTPUT VALUE |
|---|---|
| $B_0$ | 6 |
| $B_1$ | 1 |
| $B_2$ | 3 |
| $B_3$ | 0 |
| $B_4$ | 3 |
| $B_5$ | 1 |
| $B_6$ | 6 |
| $B_7$ | 1 |
| $B_8$ | 3 |
| $B_9$ | 0 |
| $B_{10}$ | 3 |
| $B_{11}$ | 1 |

(c) LUT_L[φ]

| INPUT VALUE φ | OUTPUT VALUE |
|---|---|
| $B_0$ | 6 |
| $B_1$ | 1 |
| $B_2$ | 3 |
| $B_3$ | 0 |
| $B_4$ | 3 |
| $B_5$ | 1 |
| $B_6$ | 6 |
| $B_7$ | 1 |
| $B_8$ | 3 |
| $B_9$ | 0 |
| $B_{10}$ | 3 |
| $B_{11}$ | 1 |

F I G. 3 6
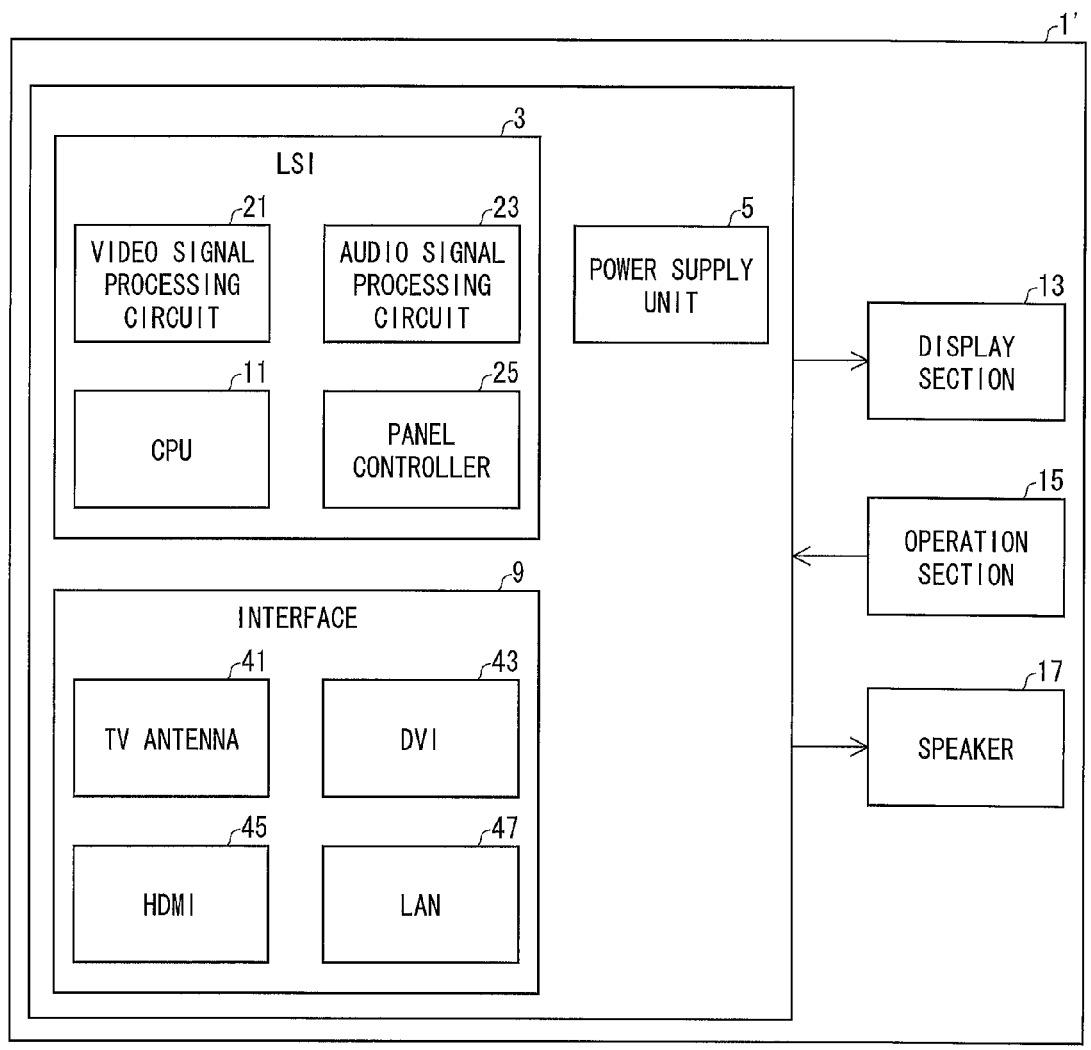

F I G. 3 7
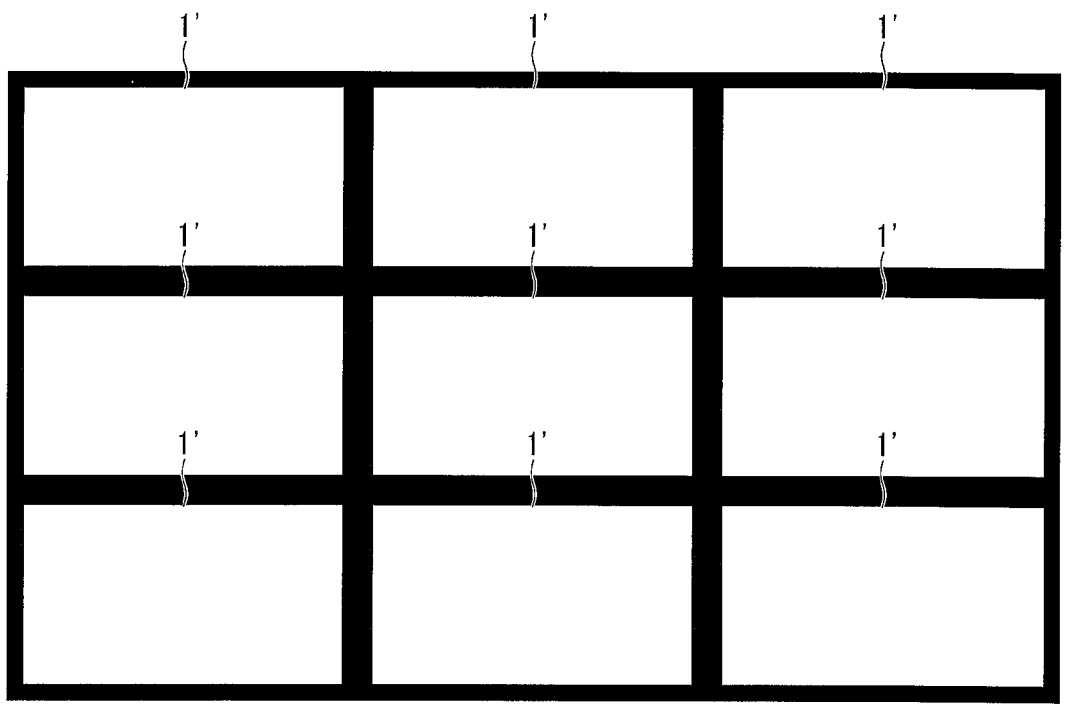

IMAGE-PROCESSING APPARATUS

TECHNICAL FIELD

The present invention relates to (i) an image processing apparatus configured to carry out high resolution processing and (ii) a recording medium.

BACKGROUND ART

As an important technology for image processing and video processing, an upscaling process is known. For example, along with the recent prevalence of displays that are compatible with FHD (Full High Definition) resolution, the upscaling process is necessary to display, with the use of an FHD resolution display, video content having SD (Standard Definition) resolution. In addition, displays compatible with QFHD (Quad Full High Definition) resolution that is superior to FHD resolution have been developed. Furthermore, research has been conducted on displays compatible with UHD (Ultra High Definition) resolution that is superior to QFHD. In line with such increases in display resolution, high performance upscaling process is growing in importance.

Examples of general techniques for upscaling process encompass interpolation methods such as nearest neighbor interpolation, bilinear interpolation, and bicubic interpolation. According to the nearest neighbor interpolation, interpolation is carried out by use of a value of a pixel located nearest to a reference position. Therefore, in a case where an enlargement (zooming) ratio is high, several identical pixels are arranged continuously. This results in substandard tone reproduction, and causes edge parts to be jagged. According to the bilinear interpolation, a pixel value of a reference position is determined by linearly interpolating pixel values of 2×2 pixels (4 pixels) in the vicinity of the reference position. Although the bilinear interpolation is superior in precision to the nearest neighbor interpolation, the bilinear interpolation uses pixel values which have been subjected to linear interpolation. This makes an image seem blurred. According to the bicubic interpolation, a pixel value of a reference position is determined by cubically interpolating pixel values of 4×4 pixels (16 pixels) in the vicinity of a reference position. Although the bicubic interpolation is superior in performance to the nearest neighbor interpolation and the bilinear interpolation, there still occurs a problem of jaggy edge parts with the bicubic interpolation.

Patent Literature 1 discloses a method of carrying out high quality upscaling process of an image and a video without requiring complex processing. According to the upscaling process disclosed in Patent Literature 1, oblique high resolution (HR) pixels are first generated by use of low resolution input pixels which are adjacent in an oblique direction. Next, horizontal high resolution (HR) pixels are generated by use of (i) low resolution input pixels which are adjacent in a horizontal direction and (ii) oblique high resolution (HR) pixels which are adjacent in a vertical direction. Lastly, vertical high resolution (HR) pixels are generated by use of (i) low resolution input pixels which are adjacent in the vertical direction and (ii) oblique high resolution (HR) pixels which are adjacent in the horizontal direction. This causes a high resolution (HR) image to be generated. In addition, while each of the high resolution (HR) pixels is generated, a direction close to an edge direction is controlled to have a large weight, whereas a direction far from the edge direction is controlled to have a small weight. This prevents the occurrence of overshoot, and suppresses the occurrence of jaggy artifacts.

CITATION LIST

Patent Literature 1
Japanese Patent Application Publication, Tokukai, No. 2010-67272 (Publication Date: Mar. 25, 2010)

SUMMARY OF INVENTION

Technical Problem

However, the upscaling process disclosed in Patent Literature 1 is intended to generate an interpolation pixel located between low resolution pixels inputted. The upscaling process of Patent Literature 1 is designed to (i) calculate a lower right pixel value of a low resolution input pixel and then (ii) calculate, by use of the calculation of the lower right pixel value, a right pixel value and a lower pixel value of the low resolution input pixel. That is, according to the upscaling process of Patent Literature 1, three new output pixels are generated always from a single low resolution input pixel. This makes it difficult to realize an enlargement process with any zooming ratio not less than a zooming ratio of 2.

In addition, although it is possible to carry out an enlargement process with any zooming ratio by using interpolation methods in combination such as a combination of bilinear interpolation and bicubic interpolation, the problems of these interpolation methods still remain after all.

Furthermore, according to the upscaling process of Patent Literature 1, edge directions to be considered are limited to the horizontal direction, the vertical direction, a 45° direction, and a −45° direction. Therefore, in a case where there is an oblique edge extending in a direction other than the above described directions, a pixel of a proper direction is not referred to, and a result of interpolation may therefore become unnatural. As a way of dividing the edge directions more precisely, it is possible to refer to a wider range of pixels. In such a case, however, it is necessary to mount a larger number of line buffers in order to refer to pixels that are spaced from each other particularly in the vertical direction. This is because the range of pixels that can be referred to is dependent on the number of line buffers which can be mounted. Besides, there also exists a problem that a process of referring to a wide range of pixels requires time additionally.

The present invention has been made in view of the problem, and it is an object of the present invention to provide an image processing apparatus and a recording medium, each of which realizes an enlargement process with any zooming ratio while being capable of image processing that restricts (i) reduction in image quality and (ii) an increase in processing time.

Solution to Problem

In order to attain the object, an image processing apparatus in accordance with an aspect of the present invention is an image processing apparatus configured to enlarge or reduce, in accordance with a set zooming ratio, inputted image data by calculating an interpolation pixel between input pixels included in the inputted image data, said image processing apparatus including: a reference block setting section configured to set a reference block including the interpolation pixel; an edge gradient direction setting section configured to set an edge gradient direction of the interpolation pixel by use of input pixels located within the reference block; a reference pixel setting section configured to set four reference pixels to be respective vertices of a quadrangle having two sides perpendicular to the edge gradient direction; a reference pixel value setting section configured such that, in a case where a first reference pixel of the four reference pixels is located outside the reference block, the reference pixel value setting section determines an intersection of a boundary line of the reference block and a side of the quadrangle including the first reference pixel, specifies, as adjacent input pixels, input pixels which are adjacent to the intersection and which are located within the reference block, and evaluates, based on distances between the intersection and the respective adjacent input pixels and based on pixel values of the respective adjacent input pixels, the first reference pixel value and, in a case where the first reference pixel is located inside the reference block, the reference pixel value setting section designates, as a reference pixel value, a pixel value of an input pixel located at the first reference pixel; and an interpolation pixel value calculating section configured to calculate a pixel value of the interpolation pixel by use of the reference pixel values of the respective four reference pixels.

An image processing apparatus in accordance with an aspect of the present invention is an image processing apparatus configured to enlarge or reduce, in accordance with a set zooming ratio, inputted image data by calculating an interpolation pixel between input pixels included in the inputted image data, said image processing apparatus including: a reference block setting section configured to set a reference block including the interpolation pixel; an edge gradient direction setting section configured to set an edge gradient direction of the interpolation pixel by use of input pixels located within the reference block; a reference pixel setting section configured to set four reference pixels to be respective vertices of a quadrangle having two sides perpendicular to the edge gradient direction; a reference pixel value setting section configured such that, in a case where a first reference pixel of the four reference pixels is located outside the reference block, the reference pixel value setting section determines an intersection of a boundary line of the reference block and a side of the quadrangle including the first reference pixel, specifies, as adjacent input pixels, input pixels which are adjacent to the intersection and which are located within the reference block, and evaluates, based on distances between the intersection and the respective adjacent input pixels and based on pixel values of the respective adjacent input pixels, the first reference pixel value and, in a case where the first reference pixel is located inside the reference block, the reference pixel value setting section designates, as a reference pixel value, a pixel value of an input pixel located at the first reference pixel; a first interpolating section configured to calculate, by use of the reference pixel values of the respective four reference pixels, a first interpolation value which is a pixel value that depends on the edge gradient direction of the interpolation pixel; a second interpolating section configured to calculate, by use of interpolation that does not depend on the edge gradient direction of the interpolation pixel, a second interpolation value which is a pixel value that does not depend on the edge gradient direction of the interpolation pixel; a reliability calculating section configured to calculate reliability of the edge gradient direction of the interpolation pixel, which edge gradient direction is set by the edge gradient direction setting section; and a combining section configured to calculate a pixel value of the interpolation pixel by determining, based on the reliability, respective weight coefficients with respect to the first interpolation value and the second interpolation value and by adding, with use of the weight coefficients determined, the first interpolation value and the second interpolation value.

Advantageous Effects of Invention

With the present invention, it is possible to realize an enlargement process with any zooming ratio and to realize image processing that restricts (i) reduction in image quality and (ii) an increase in processing time.

BRIEF DESCRIPTION OF DRAWINGS

FIG. 5 is a view illustrating primary derivative filters.

FIG. 6 is a view illustrating an edge gradient calculated with respect to an input pixel.

FIG. 7 is a view illustrating segments of edge gradient directions.

FIG. 15 is a view illustrating a flow chart of a process carried out by an interpolation pixel value calculating section illustrated in FIG. 9.

FIG. 18 is a view illustrating a plurality of primary derivative filters for determining an edge gradient.

FIG. 19 is a view illustrating ND target pixels selected for determining an edge gradient direction of an interpolation pixel.

FIG. 20 is a view illustrating templates for determining an edge gradient direction.

FIG. 22 is a block diagram illustrating a configuration of an edge gradient direction setting section illustrated in FIG. 21.

FIG. 24 is a view illustrating a lookup table used by a reliability calculating section illustrated in FIG. 21.

FIG. 25 is a view illustrating a distribution (in a case where n=2) of a weight coefficient used for the Lanczos interpolation that does not depend on an edge gradient direction.

FIG. 27 is a view illustrating another lookup table used by the reliability calculating section illustrated in FIG. 21.

FIG. 28 is a block diagram illustrating a modification of the scaling section.

FIG. 29 is a block diagram illustrating a configuration of an edge gradient direction setting section illustrated in FIG. 28.

FIG. 30 is a view illustrating filters for correcting reliability.

FIG. 32 is a view illustrating another lookup table used by the reliability calculating section illustrated in FIG. 21.

FIG. 33 is a view illustrating a method of determining a parameter $\Delta\theta_{RES}$ for setting a lookup table.

FIG. 34 is a view illustrating LUT_R[φ] and LUT_L[φ] each set with respect to LUT_C[φ] illustrated in FIG. 32.

FIG. 36 is a block diagram schematically illustrating a configuration of a monitor in accordance with Embodiment 3 of the present invention.

FIG. 37 is a view illustrating a multi-display which is an example of application of the monitor illustrated in FIG. 36.

DESCRIPTION OF EMBODIMENTS

The following description will discuss embodiments of the present invention with reference to the drawings. In the description, identical members are assigned the same reference signs accordingly, and they are identical in name and function. Therefore, their detailed descriptions will not be repeated.

Embodiment 1

Configuration of Television Receiver

Figure 1:
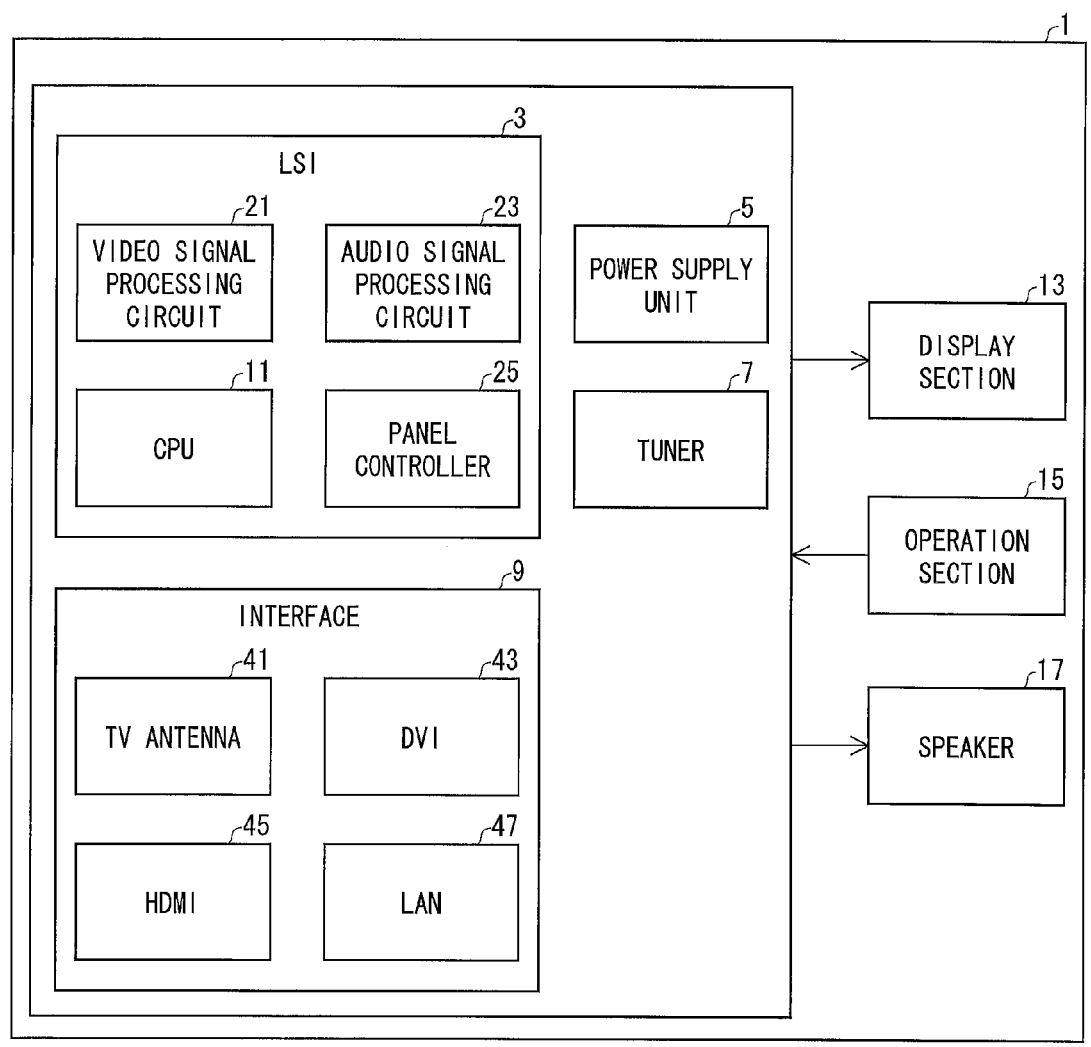
FIG. 1 is a block diagram schematically illustrating a configuration of a television receiver in accordance with Embodiment 1 of the present invention.

FIG. 1 is a block diagram schematically illustrating a configuration of a television receiver in accordance with Embodiment 1. As illustrated in FIG. 1, a television receiver (image processing apparatus) 1 includes (I) an integrated circuit (LSI) 3 including (a) a central processing unit (CPU) 11 configured to control the entire television receiver 1, (b) a video signal processing circuit 21, (c) an audio signal processing circuit 23, and (d) panel controller 25, (II) a power supply unit 5, (III) a tuner 7, (IV) an interface 9, (V) a display section 13, (VI) an operation section 15, and (VII) a speaker 17.

The interface 9 includes (i) a TV antenna 41, (ii) a DVI (Digital Visual Interface) terminal 43 and an HDMI (High Definition Multimedia Interface) terminal 45 intended for serial communication by the TMDS (Transition Minimized Differential Signaling) system, and (iii) a LAN terminal 47 configured to communicate by use of a communications protocol such as TCP (Transmission Control Protocol) or UDP (User Datagram Protocol). In accordance with an instruction transmitted from the CPU 11, the interface 9 transmits/receives data to/from an external apparatus connected to the DVI terminal 43, the HDMI (registered trademark) terminal 45, or the LAN terminal 47.

The operation section 15 includes at least a power supply switch and a selector switch. The power supply switch is a switch that receives an operation instruction for instructing switching between an on state and an off state of a power supply of the television receiver 1. The selector switch is a switch that receives an operation instruction for specifying which broadcast channel is to be received by the television receiver 1. The operation section 15 transmits, in response to an operation to press the power supply switch or the selector switch, a corresponding operation instruction to the CPU 11.

Note that the above description discussed an example in which the operation section 15 included in the television receiver 1 is operated. Alternatively, it is possible to configure the operation section 15 to be included in a remote controller capable of wireless communication with the television receiver 1, so that the remote controller transmits, to the television receiver 1, an operation instruction corresponding to each of the switches. In such a case, a communication medium, via which the remote controller and the television receiver 1 communicate with each other, can be infrared light or electromagnetic rays.

Examples of the display section 13 encompass a liquid crystal display (LCD) panel and a plasma display panel. The display section 13 is capable of displaying a television program.

The power supply unit 5 controls externally supplied electric power. In response to the operation instruction supplied from the power supply switch, the CPU 11 causes the power supply unit 5 to supply electric power or to discontinue supplying electric power. In a case where the operation instruction supplied from the power supply switch instructs switching of a power status to an on state, the electric power is supplied to the entire television receiver 1. In a case where the operation instruction instructs switching of the power status to an off state, supplying of the electric power to the entire television receiver 1 is discontinued.

The tuner 7 is, for example, a terrestrial digital tuner or a BS/CS digital tuner, and is connected to the TV antenna 41, so that a broadcast signal received by the TV antenna 41 is supplied to the tuner 7. The broadcast signal is a high-frequency digital modulating signal containing video data and audio data. The tuner 7 includes a reverse interleave circuit and an error correction circuit, and generates a variable-length code by demodulating an extracted high-frequency digital modulating signal having a certain frequency. The tuner 7 (i) selects, out of broadcast signals received by the TV antenna 41, a broadcast signal specified by the CPU 11, (ii) generates a variable-length code based on the broadcast signal selected as such, and then (iii) supplies the variable-length code to the video signal processing circuit 21 and the audio signal processing circuit 23.

The video signal processing circuit 21 generates a video signal by subjecting, to various processes, the variable-length code supplied as such from the tuner 7.

The panel controller 25 controls the display section 13 to display a video based on the video signal supplied from the video signal processing circuit 21. Specifically, the panel controller 25 includes a panel drive circuit and a backlight control circuit. In accordance with an instruction from the CPU 11, the panel controller 25 (i) controls a drive of the panel drive circuit and (ii) controls a backlight provided on a back surface of the display section 13 to be turned on and off.

The audio signal processing circuit 23 includes an audio decoder. The audio signal processing circuit 23 (i) generates an audio signal by decoding the variable-length code supplied from the tuner 7, (ii) subjects the audio signal to D/A (digital/analogue) conversion, and then (iii) supplies the converted signal to the speaker 17.

Note that the above description discussed an example in which the video signal processing circuit 21 generates a video signal based on a broadcast signal which the tuner 7 receives from the TV antenna 41. Alternatively, the video signal processing circuit 21 can generate a video signal based on video data which the external apparatus transmits from the DVI terminal 43, the HDMI terminal 45, or the LAN terminal 47. In addition, the tuner 7 can include both the terrestrial digital tuner and the BS/CS digital tuner.

(Configuration of Video Signal Processing Circuit)

Figure 2:
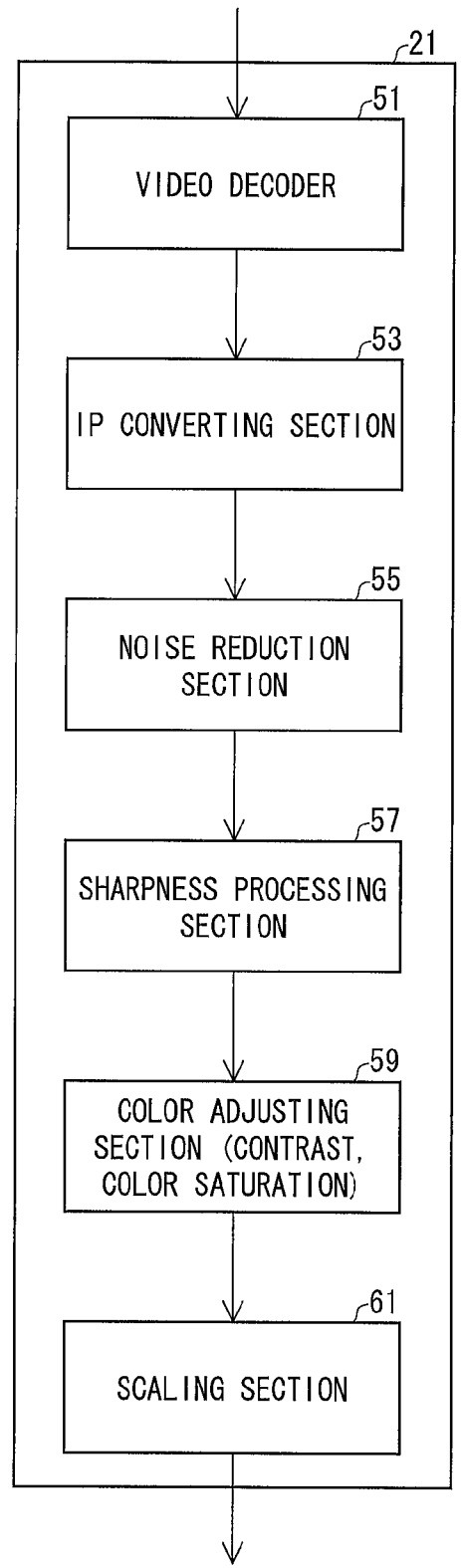
FIG. 2 is a block diagram illustrating a configuration of a video signal processing circuit illustrated in FIG. 1.

FIG. 2 is a block diagram illustrating a configuration of the video signal processing circuit. As illustrated in FIG. 2, the video signal processing circuit 21 includes a video decoder 51, an IP converting section 53, a noise reduction section 55, a sharpness processing section 57, a color adjusting section 59, and a scaling section 61.

The video decoder 51 (i) generates a video signal by decoding the variable-length code supplied from the tuner 7, (ii) subjects the video signal to D/A conversion, and (iii) supplies the converted video signal to the IP converting section 53. As necessary, the IP converting section 53 converts, from an interlace mode to a progressive mode, the video signal supplied as such from the video decoder 51. The noise reduction section 55 carries out a noise reduction process for reducing noise component contained in the video signal supplied from the IP converting section 53. The sharpness processing section 57 carries out a sharpness increasing process in which sharpness of the video based on a video signal supplied from the noise reduction section 55 is increased. The color adjusting section 59 subjects a video signal, which has been supplied from the sharpness processing section 57, to a color adjusting process in which contrast, color saturation, and the like are adjusted. The scaling section 61 subjects a video signal, which has been supplied from the color adjusting section 59, to a scaling process that is carried out in accordance with the number of pixels of the display section 13. Note that, as necessary, the CPU 11 causes a frame memory (not illustrated) to store, during each frame unit, the video signals which are subjected to the respective processes carried out in the video signal processing circuit 21.

The scaling process includes at least a process in which (i) image data of each frame unit included in the video data is enlarged (or reduced) with a zooming ratio (scaling factor) corresponding to the number of pixels of the display section 13 and (ii) pixels, which need to be interpolated as a result of the enlargement (or reduction), are calculated as an interpolation pixel. A location of the interpolation pixel is determined by the zooming ratio with which the image data is enlarged (or reduced).

(Configuration Scaling Section)

Figure 3:
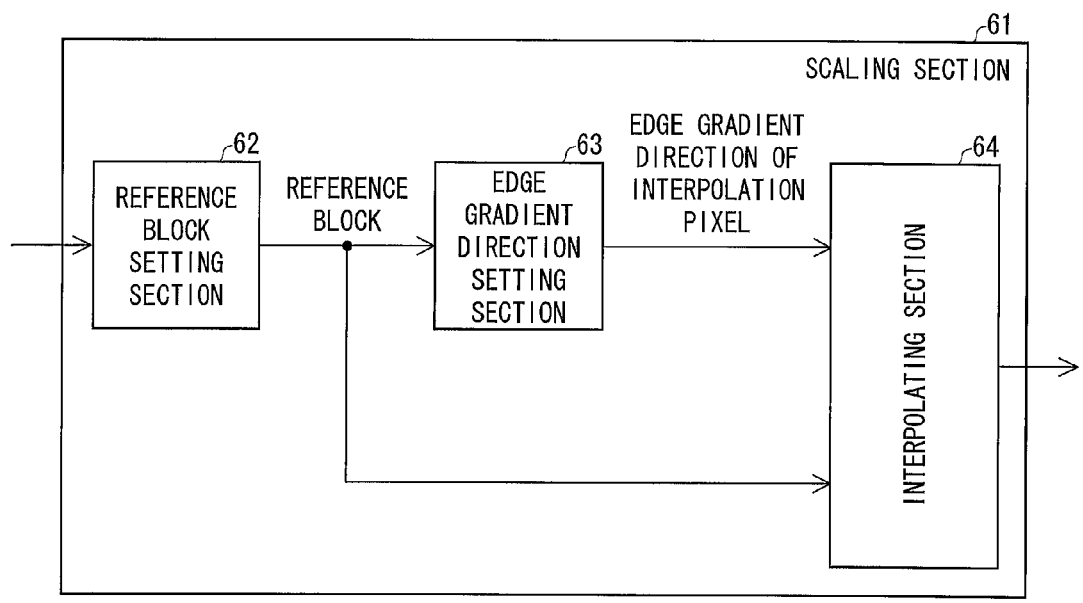
FIG. 3 is a block diagram illustrating a configuration of a scaling section illustrated in FIG. 2.

FIG. 3 is a block diagram illustrating a configuration of the scaling section 61. As illustrated in FIG. 3, the scaling section 61 includes a reference block setting section 62, an edge gradient direction setting section 63, and an interpolating section 64.

The reference block setting section 62 sets a reference block that is a set of input pixels to be referred to by the edge gradient direction setting section 63 and the interpolating section 64 by which the reference block setting section 62 is followed. The reference block setting section 62 extracts, out of input pixels located in the vicinity of an interpolation pixel, a reference block that is a set of a plurality of pixels constituted by M (M is a predetermined natural number that is 4 or greater) pixels in a vertical direction and N (N is a predetermined natural number that is 4 or greater) pixels in a horizontal direction.

Figure 4:
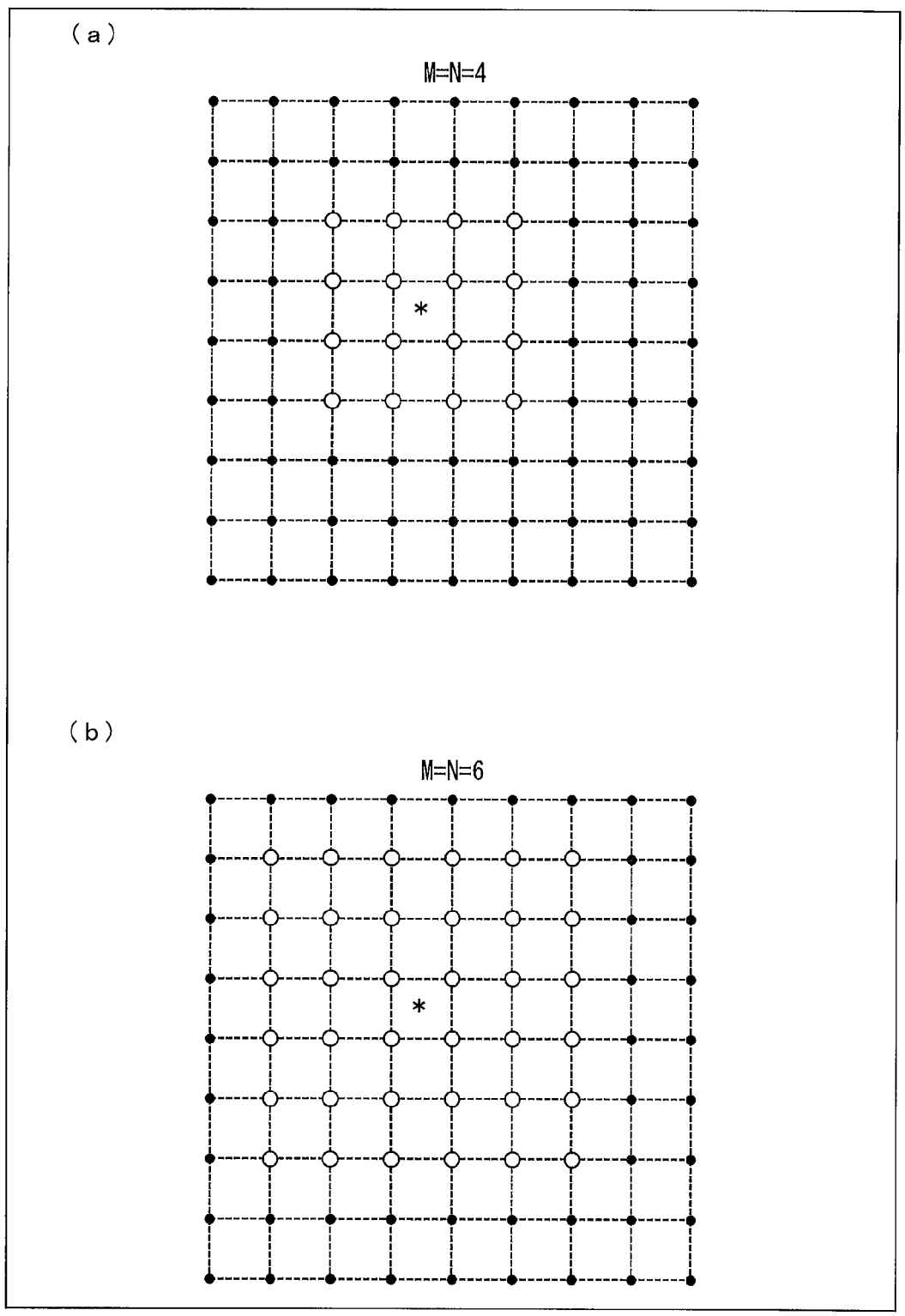
FIG. 4 is a view illustrating an example of a reference block with respect to an interpolation pixel.

FIG. 4 is a set of views (a) and (b) each showing an example of a reference block for an interpolation pixel, (a) of FIG. 4 illustrating a reference block of M=N=4 and (b) of FIG. 4 illustrating a reference block of M=N=6. In FIG. 4, dots shown as black circles indicate input pixels, whereas dots shown as white circles indicate pixels extracted as a reference block from the input pixels. In addition, dots shown as * indicate interpolation pixels. According to Embodiment 1, a plurality of line buffers are provided for constituting a reference block by a plurality of lines of input pixels. The number of M pixels in the vertical direction is set according to the number of line buffers. Note that the number of N pixels in the horizontal direction does not need to match the number of M pixels, and it is possible, as necessary, to increase interpolation accuracy in the horizontal direction by configuring the number of N pixels to be greater than the number of M pixels. A case where an IP conversion process is carried out by the IP converting section 53 is an example of configuring the number of N pixels to be greater than the number of M pixels.

The reference block setting section 62 (i) reads out, from the line buffers, pixel coordinates and a pixel value (density level) of each of input pixels which have been extracted as a reference block and (ii) causes the pixels coordinates and the pixel value read out as such to be stored in the memory, so that the edge gradient direction setting section 63 and the interpolating section 64 can easily access the pixels coordinates and the pixel value.

The edge gradient direction setting section 63 (i) determines an edge gradient of a single input pixel selected from the input pixels within the reference block and (ii) sets a direction of the edge gradient of the interpolation pixel in accordance with the edge gradient.

The edge gradient direction setting section 63 only needs to select, as an input pixel whose edge gradient is to be determined, an input pixel among the reference block, which input pixel has a close correlation with the interpolation pixel. As an input pixel having a close correlation with the interpolation pixel, it is only necessary to select, for example, an input pixel (i, j) having coordinates of i, j which are maximum integers not exceeding x, y, respectively, where coordinates of the interpolation pixel are (x, y) (provided that x, y are each a real number that is 0 or greater). For example, in a case where neither x nor y is an integer, it is only necessary to select an input pixel located closest to the interpolation pixel in an upper-left direction. Alternatively, it is also possible to select an input pixel having coordinates whose Euclidean distance from the coordinates (x, y) is minimum. In addition, the pixel value (density level) (i) can be a grayscale value in a case where an input image is based on a grayscale mode and (ii) can be a value calculated based on such three components as R, G, and B in a case where an input image is based on an RGB mode. Examples of the value calculated based on such three components as R, G, and B encompass (i) an average value of the three components, (ii) a maximum value of the three components, and (iii) a value determined by converting the three components into luminance components.

Next, with the use of a primary derivative filter illustrated in FIG. 5, the edge gradient direction setting section 63 calculates, according to the following equations, (i) a primary derivative value Gx (i, j) in the horizontal direction of the input pixel (i, j) and (ii) a primary derivative value Gy (i, j) in the vertical direction of the input pixel (i, j).

$$Gx(i,j)=IN(i+1,j-1)+IN(i+1,j)\times a+IN(i+1,j+1)-IN(i-1,j-1)-IN(i-1,j)\times a-IN(i-1,j+1) \quad \text{Equation (1-1)}$$

$$Gy(i,j)=IN(i-1,j+1)+IN(i,j+1)\times a+IN(i+1,j+1)-IN(i-1,j-1)-IN(i,j-1)\times a-IN(i+1,j-1) \quad \text{Equation (1-2)}$$

where (i) IN (i, j) indicates an input pixel value at the coordinates (i, j) and (ii) i and j are each a natural number. In addition, the edge gradient direction setting section 63 designates, as an edge gradient, a vector G=(Gx, Gy) made up of the primary derivative value Gx in the horizontal direction and the primary derivative value Gy in the vertical direction.

Note that a coefficient a of the primary derivative filter is any positive coefficient. In a case where coefficient a=1, the primary derivative filter can be used as a Prewitt filter. In a case where coefficient a=2, the primary derivative filter can be used as a Sobel filter. Note also that the primary derivative filter is not limited to a filter having a 3×3 pixel size as illustrated in FIG. 5, but only needs to have a size determined according to a size of a reference block. That is, the size of the primary derivative filter is determined to be as large as possible on condition that the primary derivative filter uses only the pixels within the reference block. For example, in a case where a reference block is as illustrated in (b) of FIG. 4, it is possible to use a primary derivative filter having a 5×5 pixel size.

Next, the edge gradient direction setting section 63 sets, by use of the edge gradient calculated, the edge gradient direction of the interpolation pixel.

FIG. 6 is a view illustrating an edge gradient G=(Gx, Gy) expressed by orthogonal coordinates system. While an angle θ of the edge gradient G is determined by an arc tangent of Gx and Gy (θ=atan{Gy/Gx}), calculation of an arc tangent generally requires complex processing. According to Embodiment 1, it is not necessary to take a tiny angle difference into consideration. According to Embodiment 1, the edge gradient direction is preferably categorized into (i) the horizontal direction, (ii) the vertical direction, or (iii) any one of several directions in which a ratio between Gx and Gy is a ratio of integers. Therefore, all the directions are divided into a plurality of segments, and the edge gradient direction setting section 63 selects, as the edge gradient direction, a segment, from the plurality of segments, to which the edge gradient G belongs.

FIG. 7 shows an example in which all the directions are divided into a plurality of segments in accordance with the following rules:

Provide segments with a horizontal-direction axis in a center thereof.

Provide segments with a vertical-direction axis in a center thereof.

Provide segments with a direction meeting Gx:Gy=1:±1 in a center thereof

Provide segments with a direction meeting Gx:Gy=1:±LV in a center thereof
where LV=2, . . . , $LV_{Max}$.

Provide segments with a direction meeting Gx:Gy=LH:±1 in a center thereof
where LH=2, . . . , $LH_{Max}$.

In the foregoing rules, $LV_{Max}$ and $LH_{Max}$ are each any natural number that is 2 or greater, and are set according to the size of the reference block. For example, in a case where M=N=4, preferably $LV_{Max}=LH_{Max}=3$. In a case where M=N=6, preferably $LV_{Max}=LH_{Max}=5$.

According to the above-described rules, all the directions are divided into $\{8+4(LV_{Max}+LH_{Max}-2)\}$ segments. In a case where a half of the number of segments into which all the directions are divided is set (designated) as the number of categories NB $(=4+2(LV_{Max}+LH_{Max}-2))$ into which the edge gradient direction is divided, the segments are referred to as $B_1, \ldots, B_{NB-1}$ in clockwise order where a segment having the vertical direction in a center thereof is designated as a segment $B_0$ (that is, in a case where k=0, 1, . . . , NB−1, segments represented as $B_k$ exist in sets of two). Note that the edge direction is orthogonal to the edge gradient direction. Therefore, in a case where the edge gradient direction is $B_0$, the edge direction is the horizontal direction.

Figure 8:
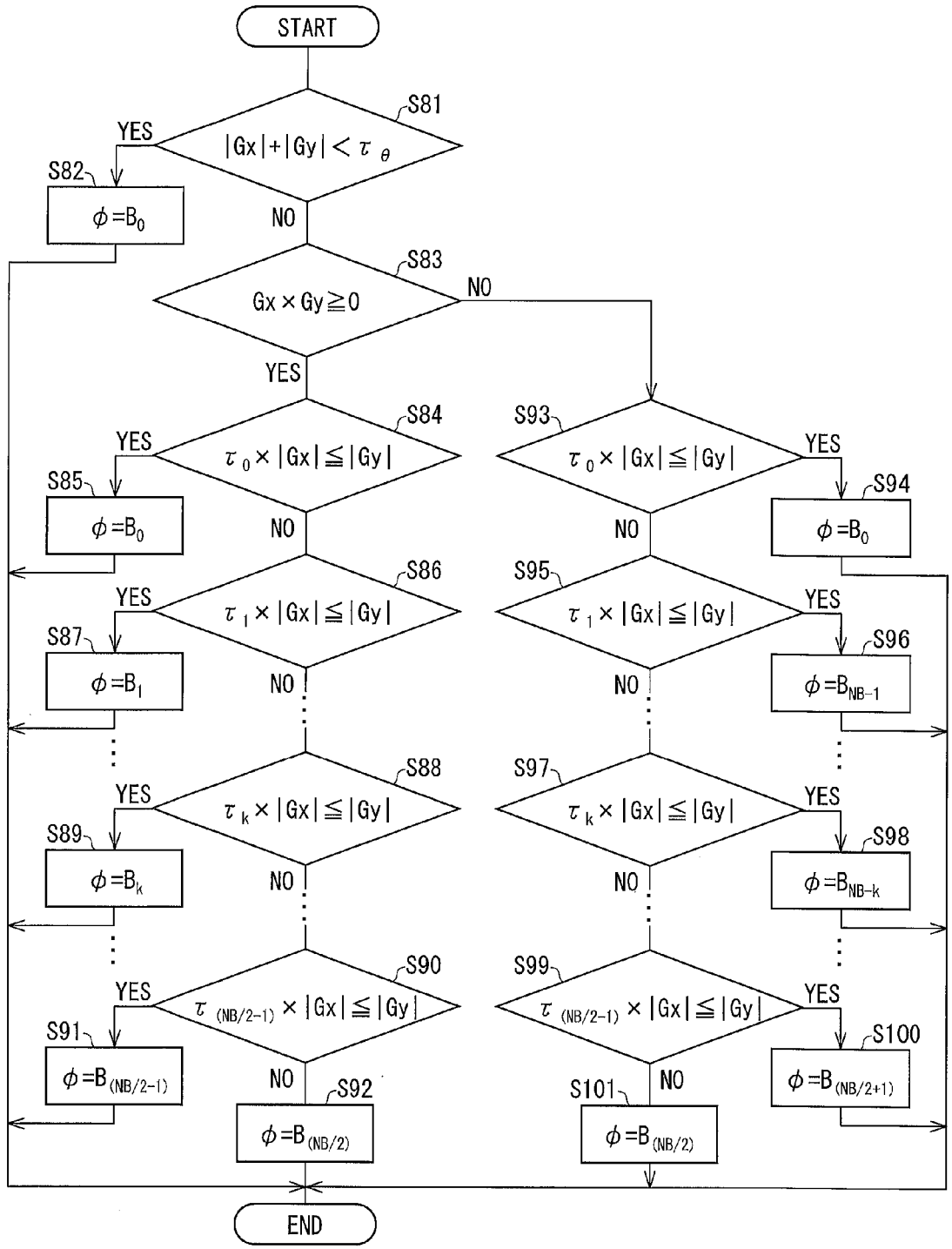
FIG. 8 is a flow chart illustrating a process of setting an edge gradient direction by use of an edge gradient G=(Gx, Gy).

FIG. 8 is a flow chart illustrating a process of setting the edge gradient direction by use of the edge gradient G=(Gx, Gy). First, the edge gradient direction setting section 63 determines, by use of Gx and Gy, whether or not an edge gradient calculated by the following criterion formula (2-1) is smaller than a predetermined threshold value $\tau_\theta$ (e.g. 16) (S81):

$$|Gx|+|Gy|<\tau_\theta \quad (2\text{-}1)$$

In a case where the edge gradient is smaller than the predetermined threshold value $\tau_\theta$, the edge gradient direction setting section 63 (i) determines that evaluation of the edge direction is impossible and (ii) sets the edge gradient direction φ as $B_0$ (S82).

In a case where the edge gradient is larger than the predetermined threshold value $\tau_\theta$, the edge gradient direction setting section 63 determines whether or not the following criterion formula (2-2) is satisfied (S83):

$$Gx \times Gy \geq 0 \quad (2\text{-}2)$$

Note that the criterion formula (2-2) determines whether or not the respective signs of Gx and Gy are the same.

In a case where the criterion formula (2-2) is satisfied, the edge gradient direction setting section 63 determines whether or not the following criterion formula (2-3) is satisfied (S84):

$$\tau_0 \times |Gx| \leq |Gy| \quad (2\text{-}3)$$

Note that a coefficient $\tau_0$ in the criterion formula (2-3) is any constant described below. For example, $\tau_0=13$. In a case where the criterion formula (2-3) is satisfied, the edge gradient direction setting section 63 (i) determines that the edge gradient G is substantially of the vertical direction and (ii) sets the edge gradient direction φ as $B_0$ (S85).

In a case where the criterion formula (2-3) is not satisfied, the edge gradient direction setting section 63 determines whether or not the following criterion formula (2-4) is satisfied (S86):

$$\tau_1 \times |Gx| \leq |Gy| \quad (2\text{-}4)$$

Note that a coefficient $\tau_1$ in the criterion formula (2-4) is any constant described below. For example, $\tau_1=2.5$. In a case where the criterion formula (2-4) is satisfied, the edge gradient direction setting section 63 (i) determines that the edge gradient G is substantially of a direction represented as Gx:Gy=1:$LV_{Max}$ and (ii) sets the edge gradient direction φ as $B_1$ (S87).

Thereafter, the edge gradient direction setting section 63 likewise determines whether or not the following criterion formula (2-5) is satisfied (S88). In a case where the criterion formula (2-5) is satisfied, the edge gradient direction setting section 63 sets the edge gradient direction φ as $B_k$ (S89):

$$\tau_k \times |Gx| \leq |Gy| \qquad (2\text{-}5)$$

In a case where the criterion formula (2-5) is not satisfied, k is updated to k+1, and the edge gradient direction setting section 63 repeats the process of determining whether or not the criterion formula (2-5) is satisfied. The edge gradient direction setting section 63 determines whether or not the criterion formula (2-5) is satisfied where k=NB/2−1 (S90, S91). In a case where the criterion formula (2-5) is not satisfied where k=NB/2−1, the edge gradient direction setting section 63 (i) sets the edge gradient direction φ as $B_{NB/2}$ (S92) and (ii) ends determining whether or not the criterion formula (2-5) is satisfied.

Note that the above-described coefficients $\tau_0, \ldots, \tau_{NB/2-1}$ are any coefficients set in accordance with the following rules:

$\tau_0 > LV_{Max}$

With respect to k=1, ..., $LV_{Max}$−1, $LV_{Max}$−k<$\tau_k$<$LV_{Max}$−k+1

With respect to k=$LV_{Max}$, ..., NB/2−1, 1/(k−$LV_{Max}$+2)< $\tau_k$<1/(k−$LV_{Max}$+1)

0<$\tau_{NB/2-1}$<1/$LH_{Max}$

For example, in a case where $LH_{Max}$=$LV_{Max}$=3, that is, NB=12, the coefficients can be set as follows: $\tau_0$=13, $\tau_1$=5/2, $\tau_2$=3/2, $\tau_3$=2/3, $\tau_4$=2/5, and $\tau_5$=1/13. The coefficient $\tau_0, \ldots, \tau_{NB/2-1}$ each represent a ratio between Gx and Gy of an angle of a boundary between two adjacent segments divided. For example, $\tau_2$ concerns a boundary between (i) $B_2$ which shows a direction where Gx:Gy=1:2 and (ii) $B_3$ which shows a direction where Gx:Gy=1:1. In a case where $\tau_2$=3/2, for example, a direction where Gx:Gy=1:1.5 is a direction of the boundary between $B_2$ and $B_3$.

On the other hand, in a case where the criterion formula (2-2) is not satisfied, the edge gradient direction setting section 63 determines whether or not the criterion formula (2-3) is satisfied (S90). In a case where the criterion formula (2-3) is satisfied, the edge gradient direction setting section 63 (i) determines that the edge gradient vector G extends substantially in the vertical direction and (ii) sets the edge gradient direction φ as $B_0$ (S94).

In a case where the criterion formula (2-3) is not satisfied, the edge gradient direction setting section 63 determines whether or not the criterion formula (2-4) is satisfied (S95). In a case where the criterion formula (2-4) is satisfied, the edge gradient direction setting section 63 (i) determines that the edge gradient G is substantially of a direction where Gx:Gy=1:−$LV_{Max}$ and (ii) sets the edge gradient direction φ as $B_{NB-1}$ (S96).

Thereafter, the edge gradient direction setting section 63 likewise determines whether or not the criterion formula (2-5) is satisfied (S95, S97, S99), and sets the edge gradient direction φ. That is, in a case where the criterion formula (2-5) is satisfied, the edge gradient direction setting section 63 sets the edge gradient direction φ as $B_{NB-k}$ (S96, S98, S100). In a case where the criterion formula (2-5) is not satisfied, k is updated to k+1, and the edge gradient direction setting section 63 repeats the process of determining whether or not the criterion formula (2-5) is satisfied. In a case where the criterion formula (2-5) is not satisfied where k=NB/2−1, the edge gradient direction setting section 63 (i) sets the edge gradient direction φ as $B_{NB/2}$ (S101) and (ii) ends determining whether or not the criterion formula (2-5) is satisfied. By the above-described process, it is possible to set the edge gradient direction φ of the interpolation pixel.

The interpolating section 64 calculates a pixel value of the interpolation pixel by use of (i) the reference block set by the reference block setting section 62 and (ii) the edge gradient direction determined by the edge gradient direction setting section 63.

Figure 9:
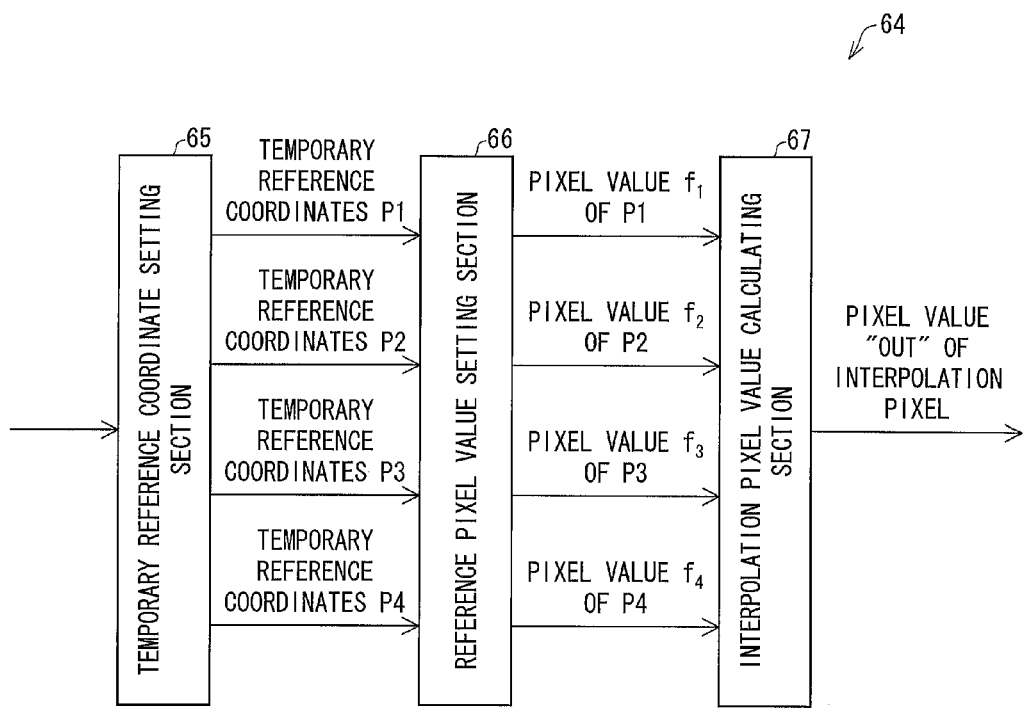
FIG. 9 is a block diagram illustrating a configuration of an interpolating section illustrated in FIG. 3.

FIG. 9 is a block diagram illustrating a configuration of the interpolating section 64. As illustrated in FIG. 9, interpolating section 64 includes a temporary reference coordinate setting section 65, a reference pixel value setting section 66, and an interpolation pixel value calculating section 67.

The temporary reference coordinate setting section 65 (i) sets four points that are vertices of a parallelogram which contains the interpolation pixel therein and which has two sides extending parallel to the edge direction (i.e. two sides perpendicular to the edge gradient direction) and (ii) specifies respective sets of coordinates (respective sets of x coordinate and y coordinate) of the four points as temporary reference coordinates. Examples of the parallelogram encompass a square. Points whose coordinates are represented by integers are set as the four points that are the vertices of the parallelogram.

Figure 10:
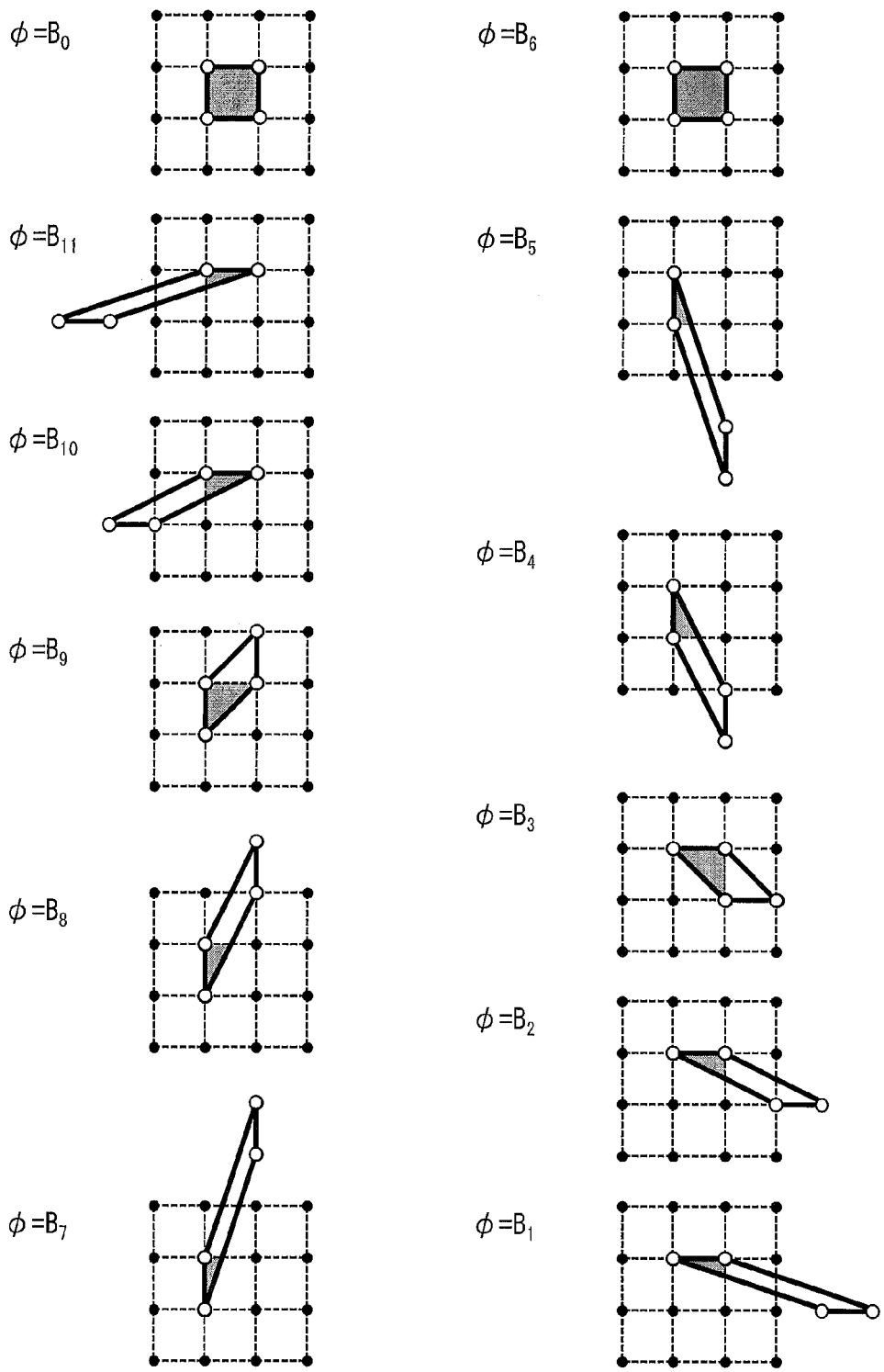
FIG. 10 is a view illustrating an example of an parallelogram with respect to an edge gradient direction φ of an interpolation pixel in a case where (i) a reference block is of M=N=4 and (ii) the number (NB) of segments into which an edge gradient direction is divided is 12.
Figure 11:
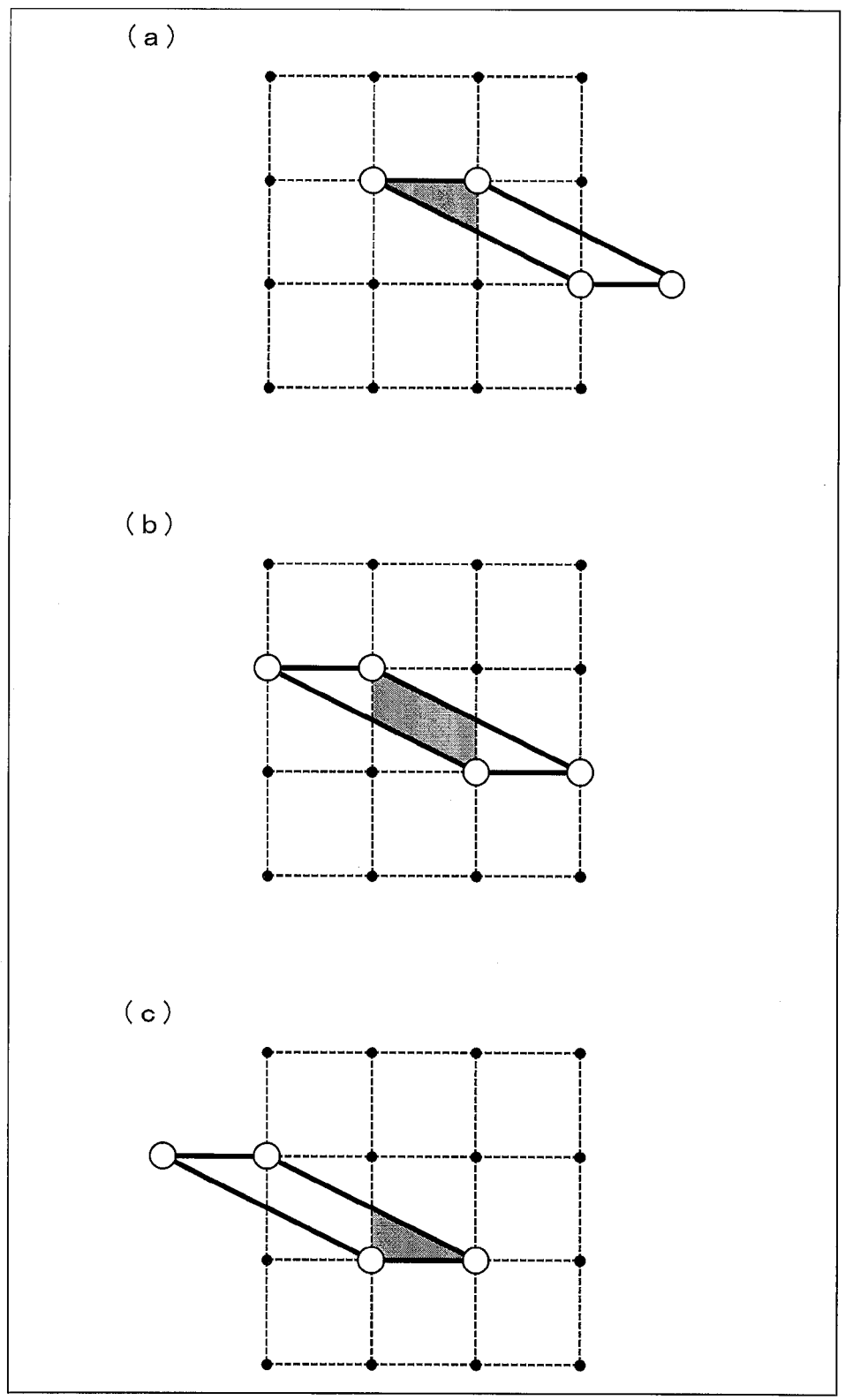
FIG. 11 is a view illustrating relationships between locations of interpolation pixels and respective locations of parallelograms each having temporary reference coordinates as their vertices.

FIG. 10 shows an example of a parallelogram with respect to an edge gradient direction φ of an interpolation pixel in a case where (i) a reference block is of M=N=4 and of $LH_{Max}$=$LV_{Max}$=3 and (ii) the number (NB) of segments into which an edge gradient direction is divided is 12. It should be noted that the edge gradient direction φ and an edge direction are orthogonal to each other as has been described. The temporary reference coordinate setting section 65 specifies, as temporary reference coordinates, respective sets of coordinates of four vertices of the parallelogram set as such. Note that as illustrated in FIG. 10, at least two of the four points of the parallelogram are selected from points of input pixels within the reference block. According to the example shown in FIG. 10 (in which the reference block is of M=N=4 and of $LH_{Max}$=$LV_{Max}$=3), there are cases of the edge gradient direction where one or two points included in the parallelogram are located outside the reference block (e.g. the case where φ=$B_{10}$). However, it is not a matter for consideration at this stage whether one or two points are located inside or outside a reference block. In addition, FIG. 10 shows the example in which the interpolation pixel exists within a range shown in gray color. For example, in a case where φ=$B_2$, the temporary reference coordinate setting section 65 specifies four sets of temporary reference coordinates by changing a location of the parallelogram according to a location of the interpolation pixel (see FIG. 11), so that the parallelogram contains the interpolation pixel. In each of the cases where φ=$B_1$ through $B_5$ and $B_7$ through $B_{11}$, the temporary reference coordinate setting section 65 likewise specifies four sets of temporary reference coordinates by changing the location of the parallelogram so that the parallelogram contains the interpolation pixel.

In the example shown in FIG. 10, the temporary reference coordinate setting section 65 sets the parallelogram to have the same surface area in any case of the edge gradient direction. In each of the cases where φ=$B_0$ through $B_3$, $B_{10}$, and $B_{11}$, the temporary reference coordinate setting section 65 sets a parallelogram having two sides extending parallel to the edge direction and the other two sides extending parallel to the horizontal direction. In each of the cases where φ=$B_4$ through $B_9$, the temporary reference coordinate setting section 65 sets a parallelogram having two sides extending parallel to the edge direction and having the other two sides extending parallel to the vertical direction.

Figure 12A:
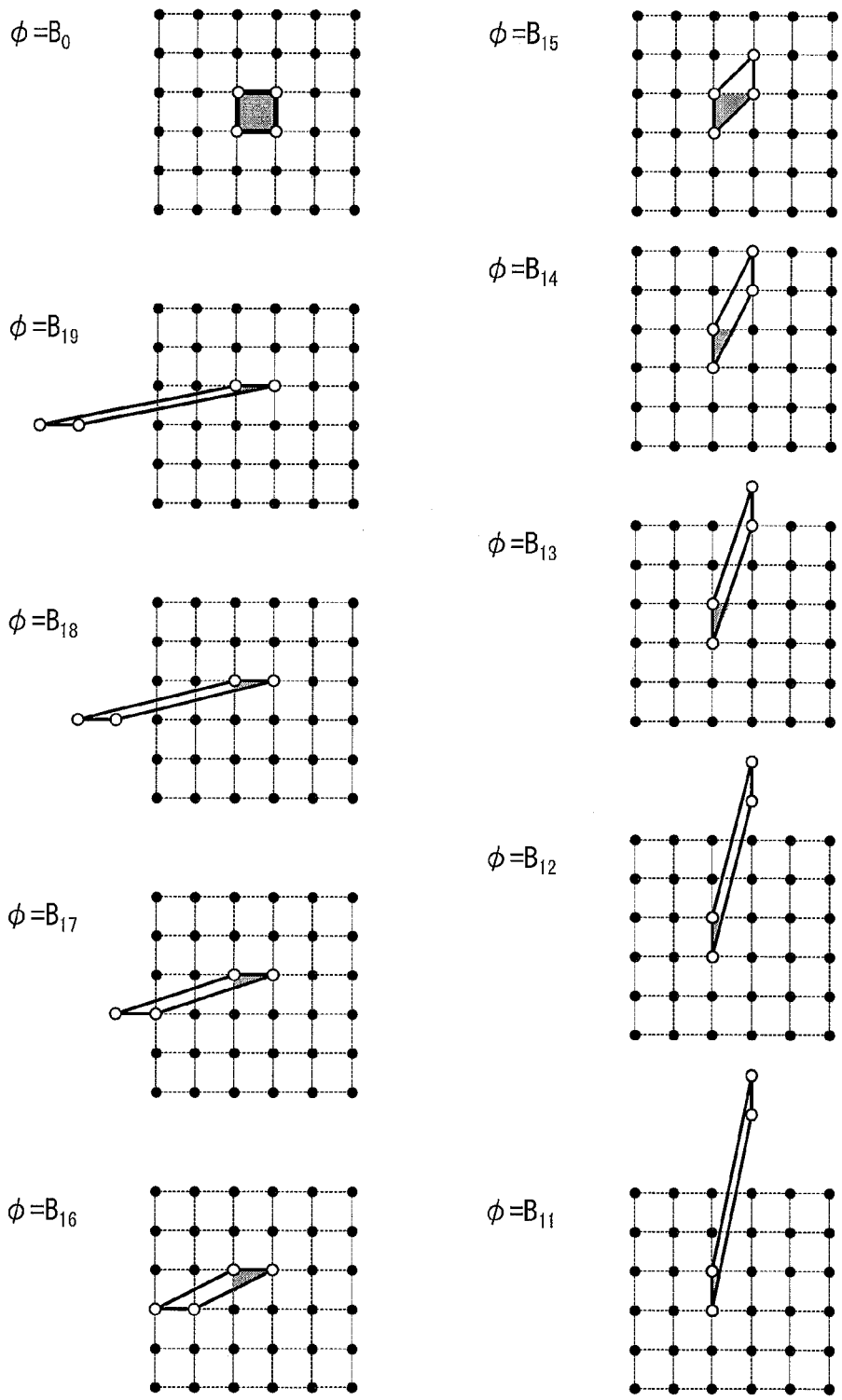
FIG. 12A is a view illustrating an example for four sets of temporary reference coordinates in cases of edge gradient directions $B_0$ and $B_{11}$ through $B_{19}$ where (i) a reference block is of M=N=6 and $LH_{Max}=LV_{Max}=5$ and (ii) the number (NB) of segments into which the edge gradient direction is divided 20.
Figure 12B:
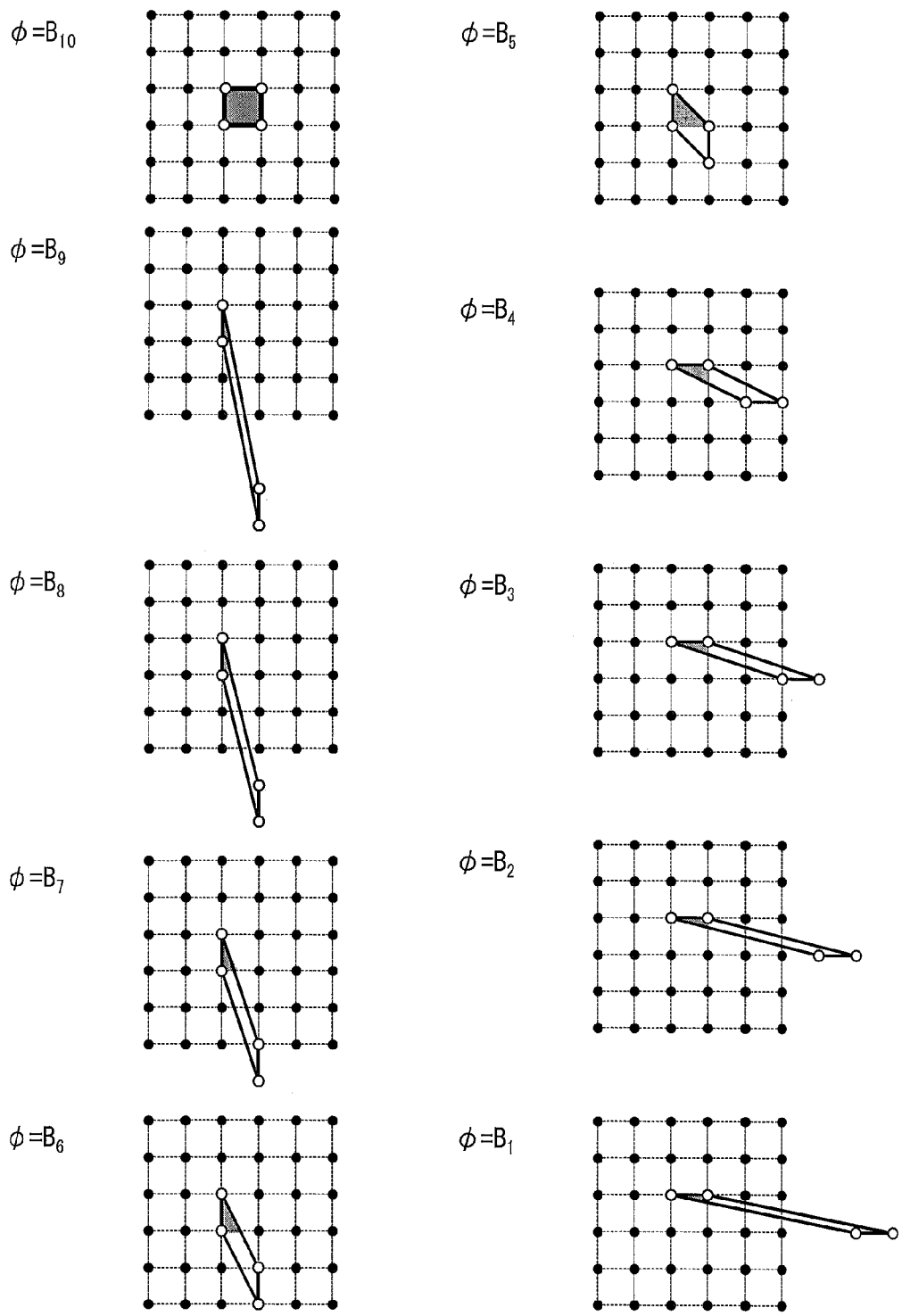
FIG. 12B is a view illustrating an example for four sets of temporary reference coordinates in cases of edge gradient directions $B_1$ through $B_{10}$ where (i) a reference block is of M=N=6 and $LH_{Max}=LV_{Max}=5$ and (ii) the number (NB) of segments into which the edge gradient direction is divided is 20.

The method of setting the temporary reference coordinates is not limited to that described above, but can vary depending on a size of a reference block and on the method of dividing an edge gradient direction. FIG. 12A and FIG. 12B each illustrate an example of four sets of temporary reference coordinates in a case where (i) a reference block is of M=N=6 and of $LH_{Max}=LV_{Max}=5$ and (ii) the number (NB) of segments into which an edge gradient direction is divided is 20.

The temporary reference coordinate setting section 65 designates the obtained four sets of the temporary reference coordinates as $P_1$, $P_2$, $P_3$, and $P_4$, respectively, and supplies the $P_1$ through $P_4$ to the reference pixel value setting section 66. Note that the $P_1$, $P_2$, $P_3$, and $P_4$ are an upper-left vertex, an upper-right vertex, a lower-right vertex, and a lower-left vertex, respectively.

Figure 13:
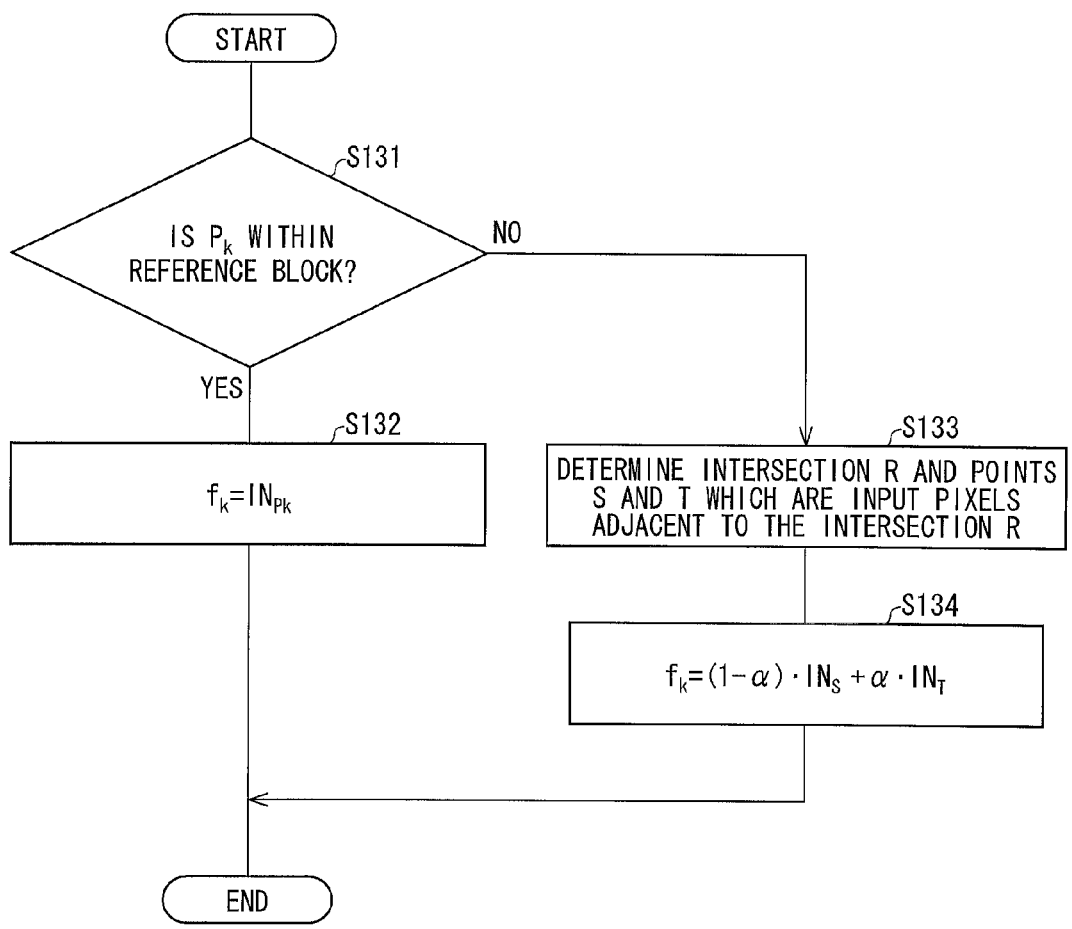
FIG. 13 is a flow chart illustrating a process for obtaining a pixel value of temporary reference coordinates performed by a reference pixel value setting section illustrated in FIG. 9.

The reference pixel value setting section 66 sets pixel values corresponding to the respective sets of temporary reference coordinates supplied from the temporary reference coordinate setting section 65. FIG. 13 is a flow chart illustrating a process of setting the pixel values corresponding to the respective sets of temporary reference coordinates.

First, the reference pixel value setting section 66 determines whether or not the temporary reference coordinates $P_k$ (where k=1, 2, 3, and 4) are included in a reference block (S131). In a case where the temporary reference coordinates $P_k$ are included in a reference block, the reference pixel value setting section 66 sets a pixel value $IN_{Pk}$ of input pixels located at the temporary reference coordinates $P_k$, which pixel value $IN_{Pk}$ serves as a pixel value $f_k$ corresponding to the temporary reference coordinates $P_k$ (S132).

Figure 14:
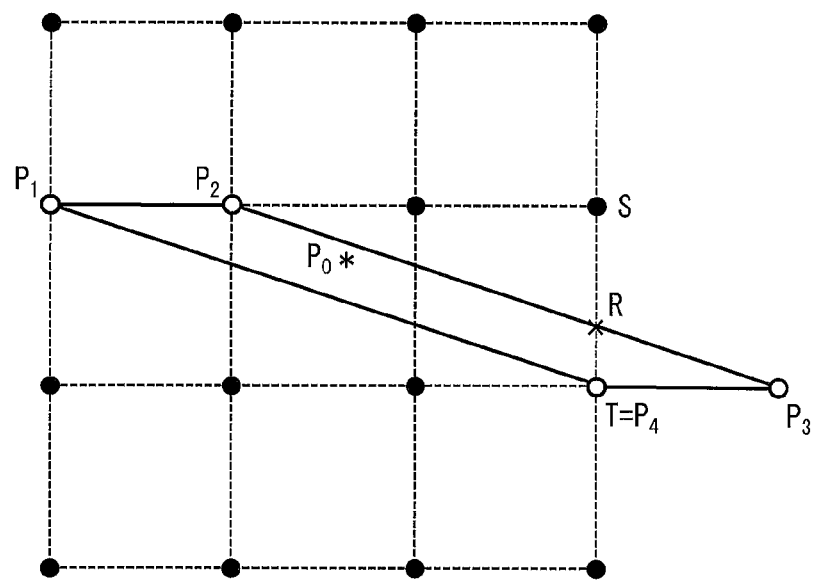
FIG. 14 is a view illustrating a process for obtaining a pixel value of temporary reference coordinates in a case where the temporary reference coordinates are located outside a reference block.

In a case where the temporary reference coordinates $P_k$ are located outside the reference block, the reference pixel value setting section 66, as illustrated in FIG. 14, (i) sets, as a point R, an intersection of (a) one side of the parallelogram having the temporary reference coordinates $P_k$ as vertices and (b) a boundary of the reference block and (ii) sets, as a point S and a point T, input pixels located on the boundary of the reference block so as to sandwich the point R (S133). Then, in a case where $SR:RT=\alpha:1-\alpha$ (where $0 \le \alpha \le 1$), the reference pixel value setting section 66 calculates the pixel value $f_k$ of the temporary reference coordinates $P_k$ in accordance with the following Equation (3) (S134):

$$f_k=(1-\alpha)IN_S+\alpha IN_T \quad (3)$$

where (i) $IN_S$ indicates a pixel value of an input pixel S and (ii) $IN_T$ indicates a pixel value of an input pixel T.

In the example shown in FIG. 14, for example, a temporary (provisional) pixel R is provided on the boundary of the reference block with respect to $P_3$ located outside the reference block, so that the following is true: SR:RT=2/3:1/3 (i.e. $\alpha=2/3$). Therefore, the pixel value $f_3$ of the temporary reference coordinates $P_3$ is determined by the equation, $f_3=(1/3)IN_S+(2/3)IN_T$, in accordance with Equation (3).

The reference pixel value setting section 66 subjects, to the process illustrated in FIG. 13, the four sets of temporary reference coordinates of $P_1$, $P_2$, $P_3$, and $P_4$ so as to calculate corresponding pixel values $f_1$, $f_2$, $f_3$, and $f_4$, respectively.

As has been described, even in a case where temporary reference coordinates are located outside a reference block, the reference pixel value setting section 66 provides a temporary (provisional) pixel R on a boundary of the reference block so as to assign, by interpolation based on input pixels inside the reference block, a pixel value of the temporary reference coordinates. In other words, it is possible to set a pixel value for each set of temporary reference coordinates by referring only to input pixels set inside a reference block by the reference block setting section 62.

The interpolation pixel value calculating section 67 calculates, by interpolation calculation, a pixel value of an interpolation pixel based on the four sets of temporary reference coordinates and on their corresponding pixel values. FIG. 15 shows a flow chart illustrating a process in which the interpolation pixel value calculating section 67 carries out its process. Note that in the following description, a point on the interpolation pixel is regarded as $P_0$, and its coordinates are regarded as (px, py).

First, the interpolation pixel value calculating section 67 determines whether an edge gradient direction $\phi$ of the interpolation pixel belongs to a first direction group or a second direction group (S151). The first direction group is a group made up of directions of |Gx|<|Gy| and directions of Gx=Gy where an edge gradient G=(Gx, Gy). The second direction group is a group of directions that are not included in the first direction group. For example, in a case where NB=12, the first and second direction groups are categorized as follows:

First direction group: $B_0$, $B_1$, $B_2$, $B_3$, $B_{10}$, $B_{11}$
Second direction group: $B_4$, $B_5$, $B_6$, $B_7$, $B_8$, $B_9$ The first direction group is a group of directions in which vertices of a parallelogram having two sides parallel to an edge direction and having the other two sides parallel to the horizontal direction (horizontal axis, x-axis) are set as temporary reference coordinates. The second direction group is a group of directions in which vertices of a parallelogram having two sides parallel to the edge direction and having the other two sides parallel to the vertical direction (vertical axis, y-axis) are set as temporary reference coordinates.

Figure 16:
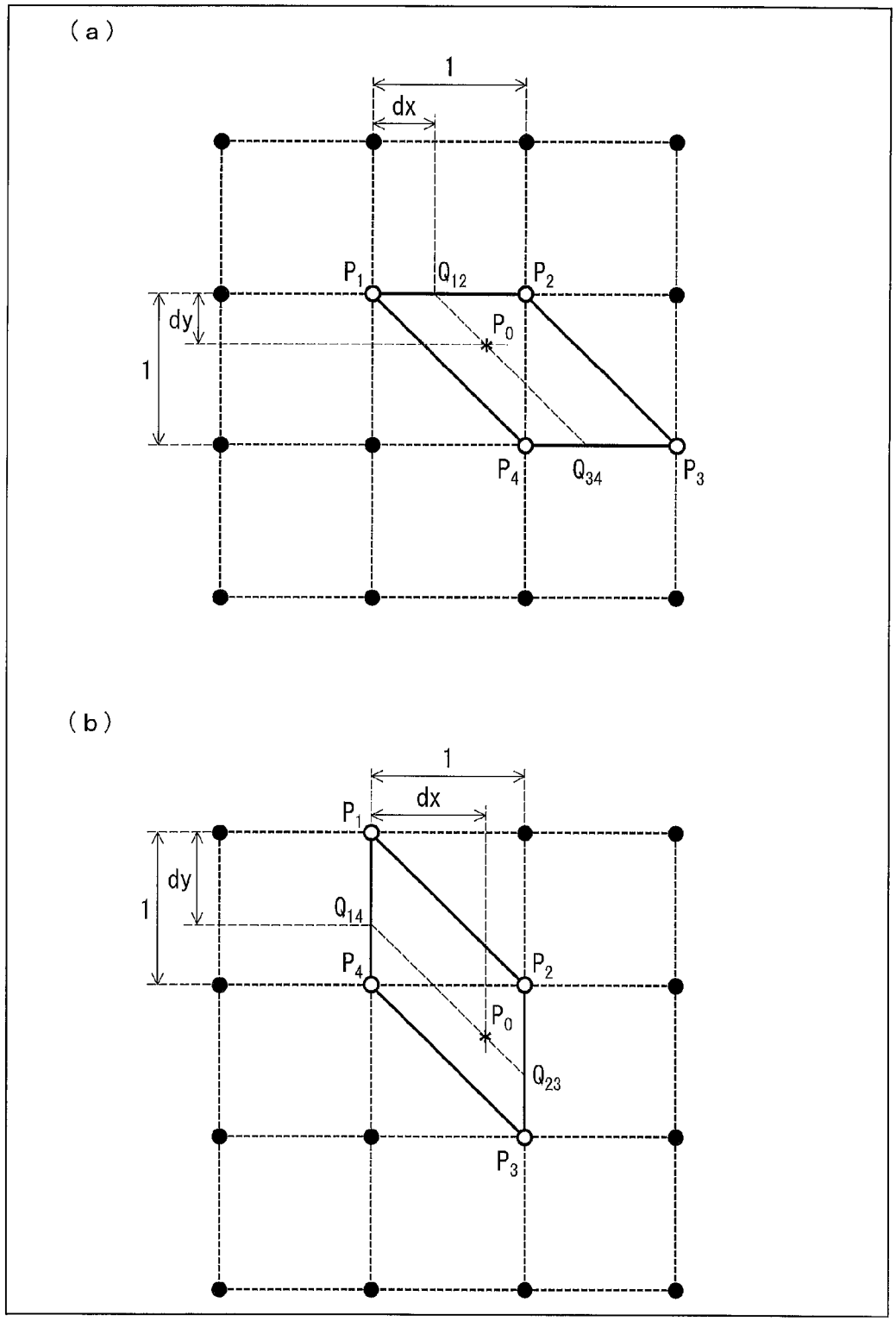
FIG. 16 is a set of views (a) and (b) each illustrating a method of calculating a pixel value of an interpolation pixel, (a) of FIG. 16 illustrating a case where the edge gradient direction φ belongs to a first direction group and (b) of FIG. 16 illustrating a case where φ belongs to a second direction group.

In a case where $\phi$ belongs to the first direction group, the interpolation pixel value calculating section 67 sets (i) an intersection $Q_{12}$ of (a) a straight line passing $P_0$ and being parallel to a side $P_1P_4$ (left-hand side) and (b) a side $P_1P_2$ (upper side) and (ii) an intersection $Q_{34}$ of (a) the straight line and (b) a side $P_3P_4$ (lower side) (S152). (a) of FIG. 16 is a view illustrating an example of the intersections $Q_{12}$ and $Q_{34}$ with respect to the $P_0$ in the case where $\phi$ belongs to the first direction group.

Figure 17:
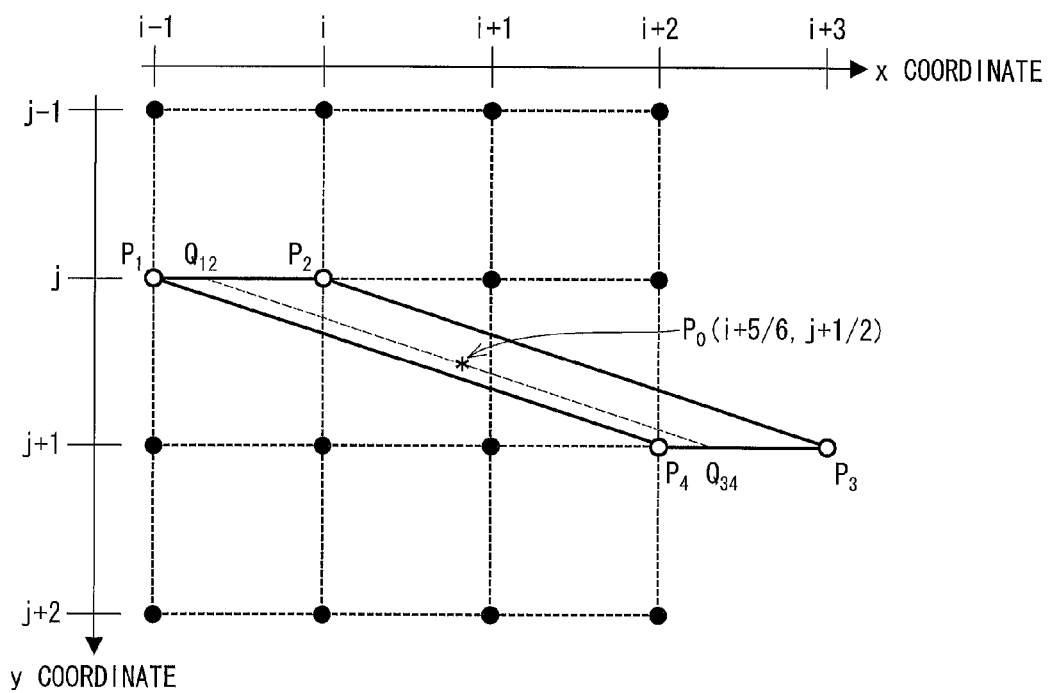
FIG. 17 is a view illustrating a method of calculating a pixel value of an interpolation pixel.

Next, the interpolation pixel value calculating section 67 calculates, in accordance with the following Equations (4), a distance dx between $P_1$ and $Q_{12}$ and a distance dy between the side $P_1P_2$ and $P_0$ (S153).

$$dx=\text{dist}\{P_1,Q_{12}\}, dy=py-[py] \quad (4)$$

where (i) dist{A,B} is a distance between points A and B and (ii) [x] is the maximum integer not exceeding x. For example, in a case where M=N=4 and where an edge gradient direction is divided as illustrated in FIG. 7, the intersections $Q_{12}$ and $Q_{34}$ are set as illustrated in FIG. 17 when the edge gradient direction $\phi$ at an interpolation pixel $P_0$ (i+5/6, j+1/2) is $B_1$. In so doing, the coordinates of $Q_{12}$ is (i−2/3, j), and the distances dx and dy are calculated as follows in accordance with Equations (4):

$$dx=\sqrt{\{(i-1)-(i-2/3)\}^2+(j-j)^2}=1/3$$

$$dy=(j+1/2)-[j+1/2]=1/2 \qquad \text{[Math. 1]}$$

Next, the interpolation pixel value calculating section 67 (i) calculates respective pixel values of $Q_{12}$ and $Q_{34}$ by linear interpolation in the horizontal direction based on $P_1$, $P_2$, $P_3$, and $P_4$ and then (ii) calculates a pixel value at $P_0$ by linear interpolation in the vertical direction based on the pixel values of $Q_{12}$ and $Q_{34}$ (S154). This horizontal interpolation and vertical interpolation can be summarized by the following single equation:

$$OUT=(1-dy)\times\{(1-dx)\times f_1+dx\times f_2\}+dy\times\{dx\times f_3+(1-dx)\times f_4\} \quad (5)$$

In a case where φ belongs to the second direction group, the interpolation pixel value calculating section 67 (i) sets an intersection $Q_{14}$ of (a) a straight passing $P_0$ and being parallel to a side $P_1P_2$ (upper side) and (b) a side $P_1P_4$ (left-hand side) and (ii) sets an intersection $Q_{23}$ of (a) the straight line and (b) a side $P_2P_3$ (right-hand side) (S155). (b) of FIG. 16 is a view illustrating an example of the intersections $Q_{14}$ and $Q_{23}$ with respect to $P_0$ in the case where φ belongs to the second direction group.

Next, the interpolation pixel value calculating section 67 calculates, in accordance with the following Equations (6), a distance dx between the side $P_1P_4$ and $P_0$ and a distance dy between $P_1$ and $Q_{14}$ (S156).

$$dx=px-[px], dy=dist\{P_1,Q_{14}\} \quad (6)$$

Next, the interpolation pixel value calculating section 67 (i) calculates respective pixel values of $Q_{14}$ and $Q_{23}$ by linear interpolation in the vertical direction based on $P_1$, $P_2$, $P_3$, and $P_4$ and then (ii) calculates a pixel value of $P_0$ by linear interpolation in the horizontal direction based on the pixel values of $Q_{14}$ and $Q_{23}$ (S157). This vertical interpolation and horizontal interpolation can be summarized by the following single equation:

$$OUT=(1-dx)\times\{(1-dy)\times f_1+dy\times f_4\}+dx\times\{(1-dy)\times f_2+dy\times f_3\} \quad (7)$$

Equation (5) and Equation (7) can each be arranged as shown in the following equation:

$$OUT=(1-dx)\times(1-dy)\times f_1+dx\times(1-dy)\times f_2+dx\times dy\times f_3+(1-dx)\times dy\times f_4 \quad (8)$$

As described above, the interpolation pixel value calculating section 67 calculates the pixel value of an interpolation pixel by linear interpolation according to a shape of a parallelogram having sides parallel to an edge direction. This allows for interpolation which depends on an edge direction. In addition, the interpolation pixel value calculating section 67 is capable of calculating a pixel value of an interpolation pixel by use of pixel values of input pixels in a reference block, regardless of whether temporary reference coordinates are located inside or outside the reference block.

Note that in a case where an inputted image is a grayscale-based image, the reference pixel value setting section 66 and the interpolation pixel value calculating section 67 calculate a pixel value by use of a grayscale value. On the other hand, in a case where an inputted image is RGB-based, the reference pixel value setting section 66 and the interpolation pixel value calculating section 67 determine a pixel value for each of R, G, and B components. That is, the reference pixel value setting section 66 calculates an R component $f_{kR}$, a G component $f_{kG}$, and a B component $f_{kB}$ of the pixel value at temporary reference coordinates $P_k$ (k=1, 2, 3, and 4). Then, the interpolation pixel value calculating section 67 calculates an R component $OUT_R$, a G component $OUT_G$, and a B component $OUT_B$ of the pixel value of the interpolation pixel.

$$OUT_R=(1-dx)\times(1-dy)\times f_{1R}+dx\times(1-dy)\times f_{2R}+dx\times dy\times f_{3R}+(1-dx)\times dy\times f_{4R}$$

$$OUT_G=(1-dx)\times(1-dy)\times f_{1G}+dx\times(1-dy)\times f_{2G}+dx\times dy\times f_{3G}+(1-dx)\times dy\times f_{4G}$$

$$OUT_B=(1-dx)\times(1-dy)\times f_{1B}+dx\times(1-dy)\times f_{2B}+dx\times dy\times f_{3B}+(1-dx)\times dy\times f_{4B} \quad (9)$$

(Modification 1 Concerning Calculation of Edge Gradient)

The above description discussed calculation of an edge gradient by use of respective primary derivative filters in the horizontal direction and in the vertical direction as illustrated in FIG. 5. However, there are cases where it is not possible to detect, by use of a primary derivative filter as illustrated in FIG. 5, an edge having a width of a single pixel, such as an edge of a text image. For example, in a case where pixel values are lined as 0-100-0, pixel values at both ends are each 0, and therefore their primary derivative values are each 0. Hence, the edge gradient direction setting section 63 can determine an edge gradient of a target pixel by applying a plurality of primary derivative filters.

For example, as illustrated in FIG. 18, an edge gradient direction setting section 63 can calculate an edge gradient of a target pixel by use of primary derivative filters made up of three filters in the horizontal direction and three filters in the vertical direction. (a) of FIG. 18 illustrates first horizontal-direction primary derivative filters Fin identical to the filters illustrated in FIG. 5. (b) of FIG. 18 illustrates first vertical-direction primary derivative filters $F_{V1}$ identical to the filters illustrated in FIG. 5. (c) of FIG. 18 illustrates second horizontal-direction primary derivative filters $F_{H2}$ obtained by (i) replacing coefficients of middle column of the first horizontal-direction primary derivative filters $F_{H1}$ with coefficients of left-hand side column and then (ii) configuring each coefficient of the left-hand side column to be 0. (e) of FIG. 18 illustrates third horizontal-direction primary derivative filters $F_{H3}$ obtained by (i) replacing coefficients of the middle column of the first horizontal-direction primary derivative filters $F_{H1}$ with coefficients of right-hand side column and then (ii) configuring each coefficient of the right-hand side column to be 0. Likewise, (d) of FIG. 18 illustrates second vertical-direction primary derivative filters $F_{V2}$ obtained by (i) replacing coefficients of middle row of the first vertical-direction primary derivative filters $F_{V1}$ with coefficients of an upper row and then (ii) configuring each coefficient of the upper row to be 0. (f) of FIG. 18 illustrates third vertical-direction primary derivative filters $F_{V3}$ obtained by (i) replacing coefficients of the middle row of the first vertical-direction primary derivative filters $F_{V1}$ with coefficients of a lower row and then (ii) configuring each coefficient of the lower row to be 0.

Where (i) primary derivative values obtained by applying $F_{H1}$ and $F_{V1}$ are $G_{x1}$ and $G_{y1}$, respectively, (ii) primary derivative values obtained by applying $F_{H2}$ and $F_{V2}$ are $G_{x2}$ and $G_{y2}$, respectively, and (iii) primary derivative values obtained by applying $F_{H3}$ and $F_{V3}$ are $G_{x3}$ and $G_{y3}$, respectively, the edge gradient direction setting section 63 uses, as an edge gradient, a group of primary derivative values of respective filters, a sum of absolute values of which primary derivative values is greatest among those of any primary derivative values in the horizontal direction and the vertical direction.

$$\{G_x(i,j), G_y(i,j)\} = \begin{cases} \{G_{x1}(i,j), G_{y1}(i,j)\} & \text{if } G_1 \geq G_2 \text{ and } G_1 \geq G_3 \\ \{G_{x2}(i,j), G_{y2}(i,j)\} & \text{if } G_2 \geq G_1 \text{ and } G_2 \geq G_3 \\ \{G_{x3}(i,j), G_{y3}(i,j)\} & \text{otherwise} \end{cases} \quad [\text{Math. 2}]$$

where $$G_1=|G_{x1}|+|G_{y1}|, G_2=|G_{x2}|+|G_{y2}|, G_3=|G_{x3}|+|G_{y3}|,$$

According to Modification 1, by using not only first primary derivative filters but also second and third primary derivative filters, it is possible to detect also an edge having a width of a single pixel.

Note that second and third primary derivative filters are particularly effective in detecting a text image, the use of only first primary derivative filters is still sufficiently effective in a case where a monitor or the like equipped with filters displays only live videos.

(Modification 2 Concerning Calculation of Edge Gradient)

The above description discussed calculation of an edge gradient by use of, as a single pixel value, a value calculated based on three components (e.g. average value, maximum value, etc.) in a case where an input image is RGB-based. Alternatively, the edge gradient direction setting section 63 can calculate an edge gradient by use of a plurality of pixel values.

An edge gradient direction setting section 63 calculates an edge gradient for each of R, G, and B components by use of the above described method of calculating the edge gradient. An edge gradient calculated for the R component is (GRx, GRy), an edge gradient calculated for the G component is (GGx, GGy), and an edge gradient calculated for the B component is (GBx, GBy). The edge gradient direction setting section 63 (i) calculates a sum of absolute values of vertical direction components and horizontal direction components of the edge gradient for each of the R, G, and B components and (ii) designates, as an edge gradient (Gx, Gy) of a target pixel, an edge gradient of which the sum of the absolute values is the greatest.

$$\{Gx(i,j), Gy(i,j)\} = \begin{cases} \{GRx(i,j), GRy(i,j)\} & \text{if } GR \geq GG \text{ and } GR \geq GB \\ \{GGx(i,j), GGy(i,j)\} & \text{if } GG \geq GR \text{ and } GG \geq GB \\ \{GBx(i,j), GBy(i,j)\} & \text{otherwise} \end{cases}$$ [Math. 3]

where $GR=|GRx|+|GRy|, GG=|GGx|+|GGy|, GB=|GBx|+|GBy|$

According to Modification 2, it is possible to determine an edge gradient which takes the tendency of each color component into consideration more than is the case where an edge gradient is calculated by use of a single pixel value. For example, between a pixel whose R, G, and B components are (0, 0, 100) and a pixel whose R, G, and B components are (100, 0, 0), the R components and the B components vary. However, the use of a single pixel value obtained by an average value or maximum value of the three components causes pixel values of both the pixels to be identical. This prevents an edge gradient from being detected. Therefore, by calculating edge gradients for the respective color components and then selecting the greatest edge gradient, it is possible to set an edge gradient which takes color components into consideration.

(Modification Concerning Setting of Edge Gradient Direction)

The above described discussed an example in which the edge gradient direction setting section 63 sets an edge gradient direction of an interpolation pixel based on an edge gradient of one of input pixels within a reference block. Alternatively, the edge gradient direction setting section 63 can set an edge gradient direction of an interpolation pixel based on edge gradients of two or more of input pixels within a reference block. Such a method will be described below.

In order to determine an edge gradient direction of an interpolation pixel, an edge gradient direction setting section 63 selects ND (ND is a natural number that is 2 or greater) input pixels from a reference block as target pixels. FIG. 19 is a view illustrating ND target pixels selected for determining an edge gradient direction of an interpolation pixel. As illustrated in FIG. 19, for example, the edge gradient direction setting section 63 selects, as target pixels, four input pixels surrounding an interpolation pixel.

Next, the edge gradient direction setting section 63 calculates edge gradients of respective ND target pixels. For the calculation, the above described method is to be used. Note that an edge gradient of a target pixel $Q_k$ (where k=1, ..., ND) is regarded as $(Gx_k, Gy_k)$.

The edge gradient direction setting section 63 (i) determines an edge gradient (Gx, Gy) of the interpolation pixel by use of ND edge gradients $(Gx_k, Gy_k)$ and (ii) calculates an edge gradient direction of the interpolation pixel. First, the edge gradient direction setting section 63 calculates a total sum $S_{Gxpos}$ of $Gx_k$ and a total sum $S_{Gyfree}$ of $Gy_k$ in a case where a value of $Gx_k$ is fixed to a positive range.

$$S_{Gxpos} = \Sigma_{k=1}^{ND} |G_{xk}|, S_{Gyfree} = \Sigma_{k=1}^{ND} G_{yk} \cdot \text{sign}(G_{xk})$$ [Math. 4]

where sign(x) is a sign function that (i) extracts 1 in a case where argument x is 0 or greater and (ii) extracts −1 in a case where argument x is a negative. Likewise, the edge gradient direction setting section 63 calculates a total sum $S_{Gypos}$ of $Gy_k$ and a total sum $S_{Gxfree}$ of $Gx_k$ in a case where a value of $Gy_k$ is fixed to a positive range.

$$S_{Gxfree} = \Sigma_{k=1}^{ND} G_{xk} \cdot \text{sign}(G_{yk}), S_{Gypos} = \Sigma_{k=1}^{ND} |G_{yk}|$$ [Math. 5]

Then, the edge gradient direction setting section 63 determines (i) a sum Sx of absolute values of $S_{Gxpos}$ and $S_{Gyfree}$ and (ii) a sum Sy of absolute values of $S_{Gxfree}$ and $S_{Gypos}$. In a case where Sx≥Sy, the edge gradient direction setting section 63 sets the edge gradient (Gx, Gy) of the interpolation pixel as $(S_{Gxpos}, S_{Gyfree})$. In a case where Sx<Sy, the edge gradient direction setting section 63 sets the edge gradient (Gx, Gy) of the interpolation pixel as $(S_{Gxfree}, S_{Gypos})$.

Then, the edge gradient direction setting section 63 sets the edge gradient direction of the interpolation pixel by use of the edge gradient (Gx, Gy). The method of setting the edge gradient direction is similar to the above described method (illustrated in FIG. 8), and therefore will not be described.

For example, in a case where (i) ND=4, (ii) $(Gx_1, Gy_1)$=(200, 100), (ii) $(Gx_2, Gy_2)$=(−100, 200), (iii) $(Gx_3, Gy_3)$=(100, −100), and (iv) $(Gx_4, Gy_4)$=(−100, −200), the following are true:

$S_{Gxpos}=200+100+100+100=500$ $S_{Gyfree}=100+200\times(-1)+(-100)+(-200)\times(-1)=0$ $S_{Gxfree}=200+(-100)+100\times(-1)+(-100)\times(-1)=100$ $S_{Gypos}=100+200+100+200=600$ and $Sx=|S_{Gxpos}|+|S_{Gyfree}|=500$, $Sy=|S_{Gxfree}|+|S_{Gypos}|=700$.

Therefore, the edge gradient direction setting section 63 sets the edge gradient (Gx, Gy) of the interpolation pixel as (100, 600).

In a case where an edge gradient direction is calculated based on a single input pixel, the edge gradient direction may not be properly calculated due to noises or the like of the input pixel selected as such. However, according to the present modification, the edge gradient direction setting section 63 integrates edge gradients surrounding an interpolation pixel as described above so as to take variations in the vertical directions and in the horizontal direction into consideration. This makes it possible to set an edge gradient direction which is unsusceptible to noises.

(Other Remarks)

The above description discussed the method in which primary derivative filters are used for determining an edge gradient direction. Alternatively, it is possible to set an edge gradient direction by use of other methods. Examples of the other methods of calculating an edge gradient direction encompass template matching. According to template matching, the edge gradient direction setting section 63 sets, as an edge quantity, a value determined by calculating filters for each pixel through utilizing template filters corresponding to respective particular directions (see FIG. 20). Then, the edge gradient direction setting section 63 only needs to determine an edge gradient direction based on a direction corresponding to a template having a calculated edge quantity that is greater than a calculated edge quantity of any other template. A method of determining the edge gradient direction is not limited to any particular one. For example, it is possible to determine an edge gradient direction by (i) setting, as a direction $\theta1$, a direction having the maximum edge quantity, (ii) setting, as a direction $\theta2$, a direction which, of two directions sandwiching the direction $\theta1$, has a greater edge quantity than does the other, (iii) determining a direction $\theta3$ by use of a weighted mean of the directions $\theta1$ and $\theta2$ where the edge quantities of the directions $\theta1$ and $\theta2$ are each taken as a weight, and (iv) determining that a direction, which is, of all of predetermined NB directions, closest to the direction $\theta3$, is the edge gradient direction.

Note that FIG. 20 is a view merely illustrating templates, and it is also possible to increase the number of patterns of directions by increasing the sizes of the templates.

Embodiment 2

Embodiment 1 described the method of carrying out interpolation in accordance with a calculated edge gradient direction. However, in regard to, for example, an image in which a background region is more blurred than is an object in the foreground, an edge gradient direction is not always reliable. In addition, there may be cases where an erroneous edge gradient direction is calculated due to noises or the like. Hence, according to Embodiment 2, reliability of a calculated edge gradient direction is evaluated, and, in a case where the reliability is low, a switch is made to interpolation which does not depend on the edge gradient direction.

(Configuration of Scaling Section)

Figure 21:
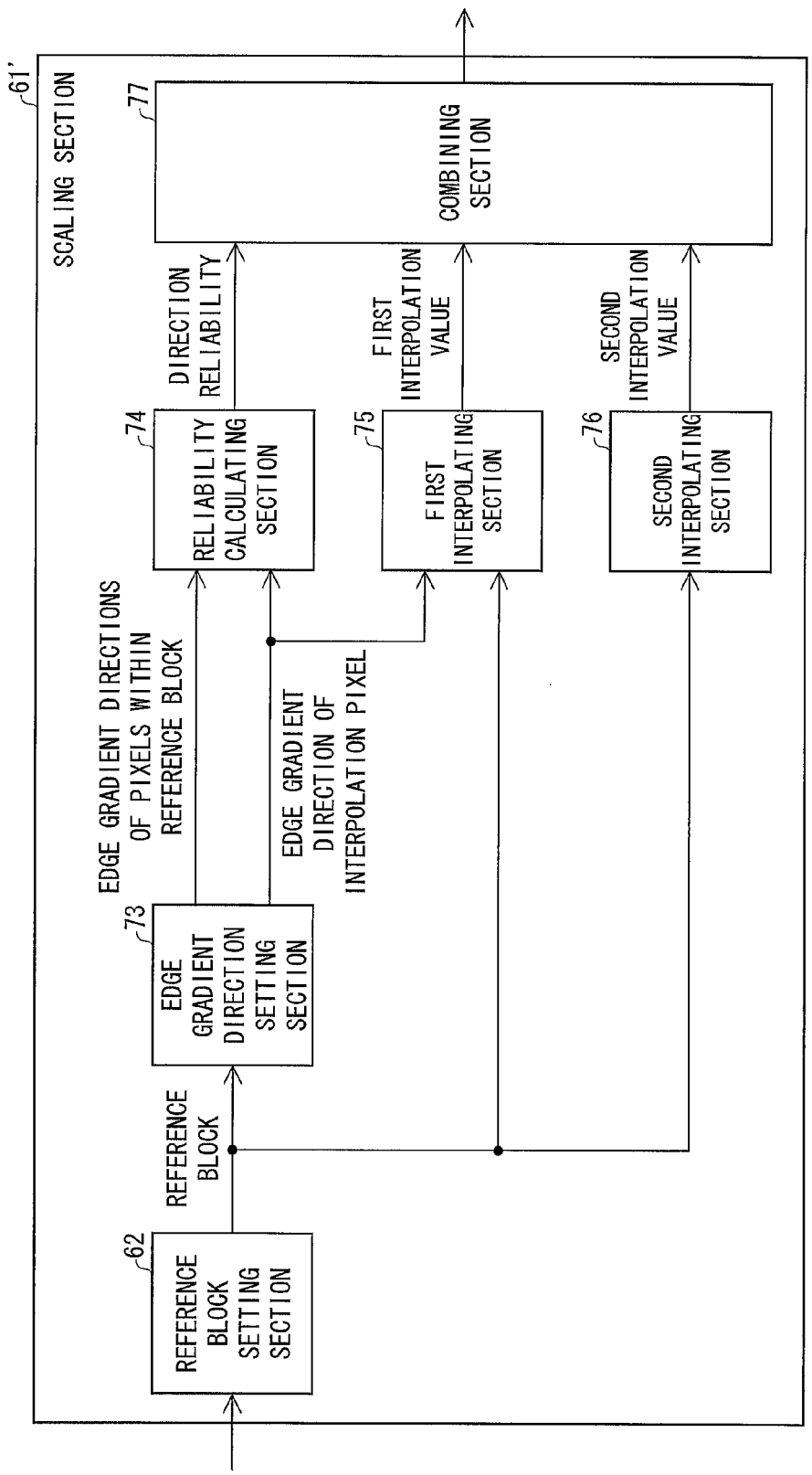
FIG. 21 is a block diagram illustrating a configuration of a scaling section included in a television receiver in accordance with Embodiment 2 of the present invention.

FIG. 21 is a block diagram illustrating a configuration of a scaling section 61' in accordance with Embodiment 2. The scaling section 61' includes a reference block setting section 62, an edge gradient direction setting section 73, a reliability calculating section 74, a first interpolating section 75, a second interpolating section 76, and a combining section 77.

FIG. 22 is a block diagram illustrating a configuration of the edge gradient direction setting section 73. The edge gradient direction setting section 73 includes an edge gradient calculating section 78, a first setting section 79, and a second setting section 80.

The edge gradient calculating section 78 calculates edge gradients of a plurality of selected pixels, which edge gradients will be needed when the first setting section 79 and the second setting section 80, by which the edge gradient calculating section 78 is followed, set edge gradient directions. Specifically, the edge gradient calculating section 78 selects, as selected pixels, $ND_{GRD}$ ($ND_{GRD}$ is a natural number that is 2 or greater) pixels within a reference block. For example, the edge gradient calculating section 78 can select, as selected pixels, four pixels surrounding an interpolation pixel. Then, the edge gradient calculating section 78 calculates an edge gradient of each of the selected pixels by a method similar to the method in which the edge gradient direction setting section 63 calculates an edge gradient in Embodiment 1. The process involved in the method has already been described above, and will therefore not be described.

The first setting section 79 further selects ND (ND is a natural number that is no less than 2 and not more than $ND_{GRD}$) selected pixels from the $ND_{GRD}$ selected pixels, and sets an edge gradient direction of each of the ND selected pixels. For example, the first setting section 79 can select all of the $ND_{GRD}$ selected pixels, or can select two selected pixels which are the first two pixels in order of closeness to the interpolation pixel. Because the respective edge gradient directions of the ND selected pixels are set, the number of edge gradient directions to be supplied is also ND. A method of setting an edge gradient direction of each of the selected pixels is similar to that described in Embodiment 1. That is, the first setting section 79 only needs to set the edge gradient direction based on the edge gradient calculated for each of the selected pixels, according to FIG. 8.

The second setting section 80 further selects NP (NP is a natural number that is not less than 1 and not more than $ND_{GRD}$) selected pixels from the $ND_{GRD}$ selected pixels, and calculates an edge gradient direction of the interpolation pixel by use of the edge gradients of the selected pixels. In a case where NP is 1, a method by which the second setting section 80 sets the edge gradient direction is similar to the method according to FIG. 8. In a case where NP is 2 or greater, the method is similar to that described in Embodiment 1 (Modification Concerning Setting of Edge Gradient Direction).

Note that each of the edge gradients of the $ND_{GRD}$ selected pixels calculated by the edge gradient calculating section 78 is selected by at least one of the first setting section 79 and the second setting section 80. Note also that edge gradients can be selected by both the first setting section 79 and the second setting section 80.

The reliability calculating section 74 calculates, by use of the ND edge gradient directions $\phi_1$ through $\phi_{ND}$ set by the first setting section 79, a reliability Vp of an edge gradient direction $\phi_p$ of the interpolation pixel set by the second setting section 80. The reliability calculating section 74 (i) determines, by comparing $\phi_p$ and $\phi_k$ (where k=1, . . . , ND), a first evaluated value $V_C$ indicative of whether or not there is a match between the direction patterns $\phi_p$ and $\phi_k$ and (ii) calculates, as reliability, a total sum of first evaluated values $V_C$ calculated for all of the ND edge gradient direction $\phi_1$ through $\phi_{ND}$.

Figure 23:
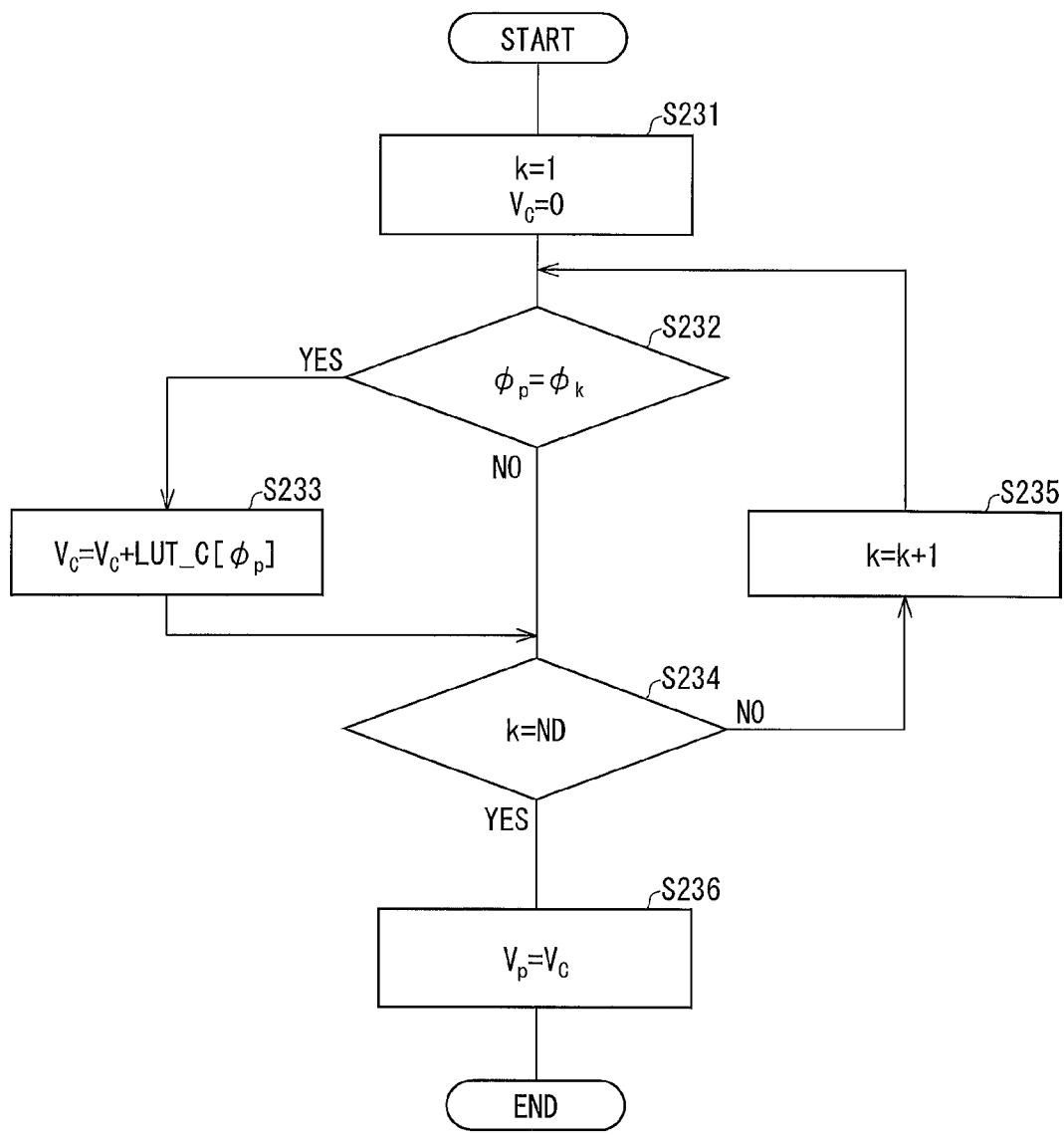
FIG. 23 is a flow chart illustrating a process of a reliability calculating section illustrated in FIG. 21.

FIG. 23 is a view illustrating a flow chart for carrying out a process of calculating reliability. FIG. 24 illustrates a lookup table that returns a value to be added to $V_C$ in a case where a direction $\phi$ is inputted.

First, the reliability calculating section 74 sets k=1 and $V_C$=0 as an initial value (S231), and compares $\phi_p$ and $\phi_k$ (S232). In a case where there is a match between $\phi_p$ and $\phi_k$, the reliability calculating section 74 adds a value of LUT_C[$\phi_p$] to $V_C$ (S233). Note that as illustrated in FIG. 24, LUT_C[$\phi$] is a lookup table that returns, for each direction $\phi$, a coefficient that is 0 or greater. The lookup tables, LUT_C[$\phi$], illustrated in FIG. 24 are examples in which NB=12, and a lookup table is not limited thereto. The reliability calculating section 74 (i) repeats the above described process for each of k=1, . . . , ND (S234, S235), (ii) updates the first evaluated value $V_C$, and (iii) supplies the reliability Vp as $V_C$ (S236).

Since $V_C$ is updated only in a case where there is a match between each of the edge gradient direction of the ND surrounding pixels surrounding interpolation pixel and the edge gradient direction of the interpolation pixel, it is possible to evaluate accuracy of the edge gradient direction of the interpolation pixel. The edge gradient direction of the interpolation pixel set by the second setting section 80 is not necessarily set in view of variations in edge gradient directions of the surrounding pixels. Therefore, the reliability calculating section 74 calculates reliability of the edge gradient direction of the interpolation pixel in view of variation in edge gradient directions of the surrounding pixels set by the first setting section 79. In a case where there is a larger variation in edge gradient directions of the surrounding pixels, reliability is lower. Therefore, by evaluating the reliability, it is possible to determine whether or not there is a variation in edge gradient directions of the surrounding pixels due to noises or the like.

The first interpolating section 75 calculates a pixel value of the interpolation pixel by use of (i) a reference block set by the reference block setting section 62 and (ii) the edge gradient direction, set by the second setting section 80, of the interpolation pixel. The first interpolating section 75 of Embodiment 2 is similar in configuration to the interpolating section 64 of Embodiment 1 illustrated in FIG. 9. That is, a temporary reference coordinate setting section 65 specifies respective sets of temporary reference coordinates of four points of which a parallelogram containing the interpolation pixel is made up. Next, a reference pixel value setting section 66 sets pixel values corresponding to the respective sets of temporary reference coordinates. Finally, an interpolation pixel value calculating section 67 calculates, based on the pixel values of the four sets of temporary reference coordinates and on a weighting coefficient, a pixel value of the interpolation pixel. According to Embodiment 2, the first interpolating section 75 does not designate the calculated pixel value of the interpolation pixel as a final value to be supplied by the scaling section 61', but supplies, as a first interpolation value $OUT_1$, the calculated pixel value to the combining section 77.

The process carried out by the first interpolating section 75 is similar to the process carried out by the interpolating section 64 of Embodiment 1, and will not be described.

The second interpolating section 76 calculates the pixel value of the interpolation pixel (i) based on the reference block and (ii) by interpolation which does not depend on the edge gradient direction.

A method, which is used by the second interpolating section 76 and which does not depend on the edge gradient direction, can be a well-known method. Examples of the method encompass the Lanczos interpolation. The Lanczos interpolation is carried out to calculate a sum of products of (i) pixel values of pixels used for interpolation and (ii) a weight coefficient determined in accordance with the following equation:

$$w(d) = \begin{cases} \mathrm{sinc}(d) \times \mathrm{sinc}\left(\dfrac{d}{n}\right) & (|d| \leq n) \\ 0 & (|d| > n) \end{cases} \quad \text{where} \quad \text{[Math. 6]}$$

$$\mathrm{sinc}(x) = \dfrac{\sin(\pi \times x)}{\pi \times x}$$

In the above equation, (i) n is a variable for controlling a property of interpolation function, and the number of pixels to be used for interpolation calculation varies depending on n and (ii) d indicates a distance between each pixel to be used for the interpolation calculation and the interpolation pixel.

FIG. 25 is a view illustrating a distribution of a weight coefficient where n=2. For example, in a case where a reference block has a size of M=N=4, the second interpolating section 76 regards n as 2, and calculates H(k) by carrying out interpolation calculation in a vertical direction as follows:

$$H(k) = w(1+\mathrm{dist}Y) \times P(k,0) + w(\mathrm{dist}Y) \times P(k,1) + w(1-\mathrm{dist}Y) \times P(k,2) + w(2-\mathrm{dist}Y) \times P(k,3) \quad (10)$$

where (i) k=0, 1, 2, and 3 and (ii) P indicates a pixel value of an input pixel for use in interpolation. Next, the second interpolating section 76 calculates a second interpolation value $OUT_2$ of the interpolation pixel by carrying out, with the use of H(k), interpolation calculation as follows:

$$OUT_2 = w(1+\mathrm{dist}X) \times H(0) + w(\mathrm{dist}X) \times H(1) + w(1-\mathrm{dist}X) \times H(2) + w(2-\mathrm{dist}X) \times H(3) \quad (11)$$

Note that the above example is of a case where an input image is a grayscale-based image, and the pixel value P is a grayscale value of each pixel. In a case where an input image is an RGB-based image, a second interpolation value of the interpolation pixel is calculated for each of R, G, and B components. Where (i) a second interpolation value of the R component is $OUT_{2R}$, (ii) a second interpolation value of the G component is $OUT_{2G}$, and (iii) a second interpolation value of the B component is $OUT_{2B}$, $OUT_2$ is represented as a vector ($OUT_{2R}$, $OUT_{2G}$, $OUT_{2B}$) of the three components of the second interpolation value of the interpolation pixel.

The process carried out by the second interpolating section 76 is not limited to the Lanczos interpolation, but can be another method. For example, it is possible to employ the bicubic interpolation as follows:

$$w(d) = \begin{cases} 1 - 2 \times d^2 + d^3 & (0.0 \leq |d| < 1.0) \\ 4 - 8 \times d + 5 \times d^2 - d^3 & (1.0 \leq |d| < 2.0) \\ 0 & (2.0 \leq |d|) \end{cases} \quad \text{[Math. 7]}$$

The combining section 77 combines, in accordance with the reliability Vp obtained by the reliability calculating section 74, (i) the first interpolation value $OUT_1$ obtained by the first interpolating section 75 and (ii) the second interpolation value $OUT_2$ obtained by the second interpolating section 76.

A mixture ratio γ of the first and second interpolation values is obtained by dividing a reliability Vp by a maximum value $Vp_{MAX}$ possible of the reliability Vp (i.e. $\gamma = Vp/Vp_{MAX}$). In a case where the reliability is calculated by, for example, a lookup table, the maximum value $Vp_{MAX}$ is obtained by the equation $Vp_{MAX} = D_{MAX} \times ND$ where the maximum value which can be referred to in the lookup table is $D_{MAX}$. The combining section 77 carries out, by use of the mixture ratio γ, weighted summing of $OUT_1$ and $OUT_2$ as shown in the following equation:

$$OUT = \gamma OUT_1 + (1-\gamma) OUT_2 \quad (12)$$

A pixel value OUT obtained by Equation (12) is a value supplied by the scaling section 61' in accordance with Embodiment 2. For example, in a case where (i) reliability Vp is 60 and (ii) the maximum value $Vp_{MAX}$ of the reliability is 100, the mixture ratio γ is 60/100 (=0.6). Therefore, the pixel value OUT is returned as 0.6 $OUT_1$ + 0.4 $OUT_2$.

In a case where the input image is RGB-based, the combining section 77 only needs to calculate pixel values for the R, G, and B components in accordance with Equation (12). The three components have a mixture ratio γ in common.

(Modification 1 of Reliability Calculating Method)

The reliability calculating method of the reliability calculating section 74 is not limited to that described above, but can be carried out as follows:

Where k=1, ..., ND, a reliability calculating section 74 (i) compares $\phi_p$ and $\phi_k$ and (ii) calculates (a) a first evaluated value $V_C$ indicative of whether or not there is a match between both the direction patterns $\phi_k$ and $\phi_p$, (b) a second evaluated value $V_R$ indicative of whether or not $\phi_k$ is adjacent to $\phi_p$ in a clockwise direction, and (c) a third evaluated value $V_L$ indicative of whether or not $\phi_k$ is adjacent to $\phi_p$ in a counterclockwise direction. Then, the reliability calculating section 74 (i) calculates total sums of the first, second and third evaluated values respectively obtained by calculating for each of edge gradient directions $\phi_1$ through $\phi_{ND}$ of ND selected pixels and then (ii) combines the total sum with the first, second, and third evaluated values.

Figure 26:
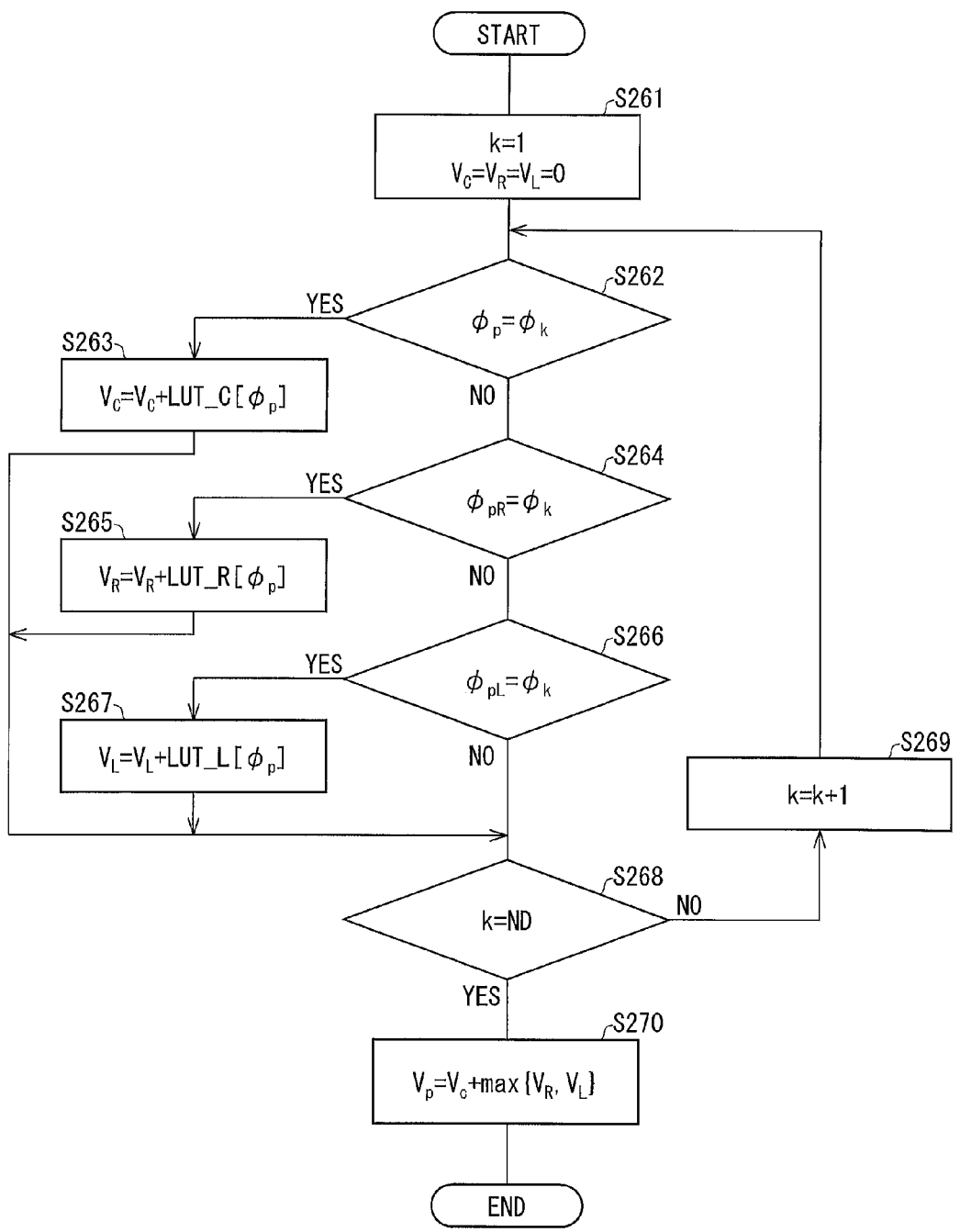
FIG. 26 is a flow chart illustrating another process of the reliability calculating section illustrated in FIG. 21.

FIG. 26 is a view illustrating a flow chart for carrying out a reliability calculating process of Modification 1 of Embodiment 2. FIG. 27 illustrates a lookup table that returns a value to be added to $V_C$, $V_R$, and $V_L$ in a case where a direction $\phi$ is inputted.

First, the reliability calculating section 74 sets k=1 and $V_C=V_R=V_L=0$ as an initial value (S261), and compares $\phi_p$ and $\phi_k$ (S262). In a case where there is a match between $\phi_k$ and $\phi_p$, the reliability calculating section 74 adds a value of LUT_C [$\phi$p] to $V_C$ (S263). Note that as illustrated in (a) of FIG. 27, LUT_C[$\phi$] is a lookup table that returns, for each direction $\phi$, a coefficient that is 0 or greater.

In a case where there is a difference between $\phi_k$ and $\phi_p$, the reliability calculating section 74 compares (i) $\phi_{pR}$ which is located adjacent to $\phi_p$ in a clockwise direction and (ii) $\phi_k$ (S264). In a case where there is a match between $\phi_k$ and $\phi_{pR}$, the reliability calculating section 74 adds LUT_R[$\phi$p] to $V_R$ (S265). Note that as illustrated in (b) of FIG. 27, LUT_R[$\phi$] is a lookup table that returns, for each direction $\phi$, a coefficient that is 0 or greater.

In a case where there is a difference between $\phi_k$ and $\phi_{pR}$, the reliability calculating section 74 compares (i) $\phi_{pL}$ which is located adjacent to $\phi_p$ in a counterclockwise direction and (ii) $\phi_k$ (S266). In a case where there is a match between $\phi_k$ and $\phi_{pL}$, the reliability calculating section 74 adds LUT_L[$\phi$p] to $V_L$ (S267). Note that as illustrated in (c) of FIG. 27, LUT_L[$\phi$] is a lookup table that returns, for reach direction $\phi$, a coefficient that is 0 or greater.

Coefficients returned by the lookup tables LUT_C, LUT_R, and LUT_L illustrated in FIG. 27 are merely examples in which NB=12, and coefficients to be returned are not limited to these coefficients.

The reliability calculating section 74 (i) repeats the above described process for each of k=1, ..., ND (S268, S269), (ii) updates the first, second, and third evaluated values $V_C$, $V_R$, and $V_L$, and finally (iii) calculates the reliability Vp in accordance with the following equation:

$$Vp = V_C + \max\{V_R, V_L\}$$

According to Modification 1 of Embodiment 2, (i) only $V_R$ is added to $V_C$ in a case where an edge gradient direction of each of the ND surrounding pixels is shifted in the clockwise direction from $\phi_p$ and (ii) only $V_L$ is added to $V_C$ in a case where the edge gradient direction of each of the ND surrounding pixels is shifted in the counterclockwise direction from $\phi_p$. This allows for evaluation of a degree of concentration to which the edge gradient direction of each of the ND surrounding pixels is shifted to the clockwise direction from $\phi_p$ and the counterclockwise direction from $\phi_p$. Then, by adding a larger one of $V_R$ and $V_L$ to $V_C$, a direction having a larger degree of concentration is prioritized. Therefore, in a case where the edge gradient directions of the surrounding pixels are similarly shifted in the clockwise direction and the counterclockwise direction from $\phi_p$, neither $V_R$ nor $V_L$ is unlikely to be large in value. This allows for low reliability.

In addition, in a case where return values of LUT_R and LUT_L are each configured to be smaller than that of LUT_C, it is possible to (i) set a high rate of contribution to the reliability in a case where there is a match between edge gradient directions and (ii) set a low rate of contribution to the reliability in a case where edge gradient directions are adjacent.

(Modification 2 of Reliability Calculating Method)

The above description discussed calculation of reliability by use of an edge gradient direction of an interpolation pixel. However, the present invention is not limited as such. For example, it is possible to calculate reliability by use of an edge gradient of an interpolation pixel calculated for determining an edge gradient direction.

FIG. 28 is a block diagram illustrating a configuration of a scaling section 61". FIG. 29 is a block diagram illustrating a configuration of an edge gradient direction setting section 81 illustrated in FIG. 28.

As illustrated in FIG. 29, the edge gradient direction setting section 81 does not include a first setting section 79, but only includes an edge gradient calculating section 78 and a second setting section 83. The second setting section 83 is similar in function to the above described second setting section 80, and is further equipped with a function to supply an edge gradient of an interpolation pixel.

The reliability calculating section 82 calculates reliability of an edge gradient direction by use of an edge gradient of an interpolation pixel. A method of the calculation is not limited to any particular one. For example, in a case where the edge gradient of the interpolation pixel is ($Gx_p$, $Gy_p$), a sum of absolute values $|Gx_p|+|Gy_p|$ can be used as a reliability Vp.

(Modification 3 of Reliability Calculating Method)

The reliability calculating sections 74 and 82 can each correct, by further applying a predetermined filter, the reliability calculated by any of the above described methods. FIG. 30 illustrates filters configured to correct the reliability. The filters are given as non-decreasing functions in a case where reliability Vp serves as an input value. For example, as shown by the example of the filter in the left-hand part of FIG. 30, it is possible to configure the output reliability to drastically decrease where the input reliability is at a predetermined threshold value or less. Alternatively, as shown by the example of the filter in the middle part of FIG. 30, it is possible to offset the reliability so that the reliability is always prevented from being 0. Alternatively, as shown by the example of the filter in the right-hand part of FIG. 30, a waveform of the filter for the correction does not need to be of continuous function, but can be a step-like form. Note that in a case where a maximum value possible of an output reliability Vp is smaller than a maximum value possible $Vp_{MAX}$ of an input reliability, the maximum value $Vp_{MAX}$ of the combining section 77 is updated to a maximum value possible $Vp_{MAX'}$ of the output reliability Vp.

According to Modification 3 of Embodiment 2, it is possible to change, by correction, the combining process carried out in each of cases where the reliability high, middle, and low. For example, in a case where the reliability is decreased by a certain degree, it is possible to correct the all the reliability to be 0 so that interpolation dependent on an edge gradient direction is turned off.

(Modification 4 of Reliability Calculating Method)

Figure 31:
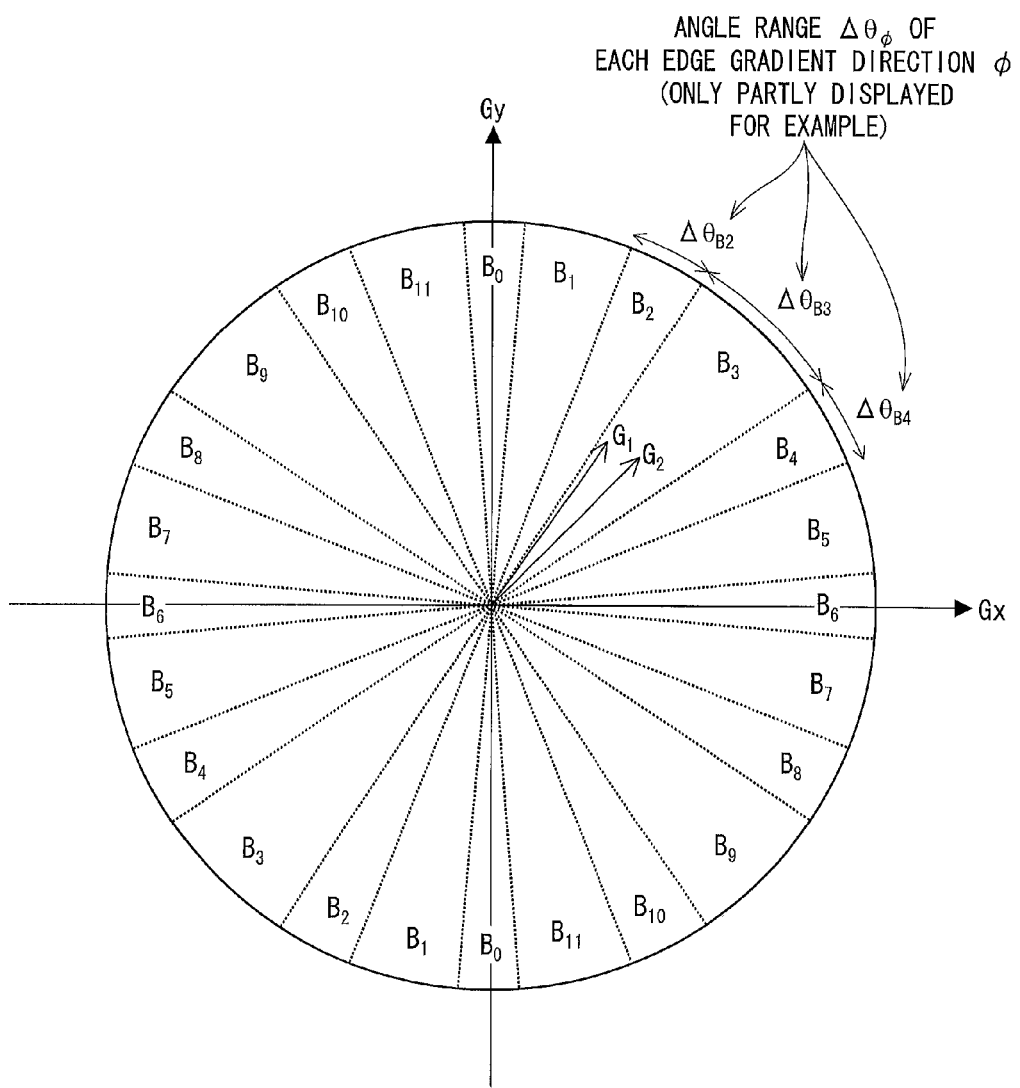
FIG. 31 is a view illustrating possible angle ranges of edge gradient directions.

According to the lookup table illustrated in FIG. 24, an identical output value is assigned to all the edge gradient directions. However, as illustrated in FIG. 31, angle ranges of respective edge gradient directions are not uniform. For example, while edge gradient directions at ±45° direction ($B_3$ and $B_9$ in FIG. 31) each have a wide angle range, edge gradient direction at the horizontal direction and the vertical direction ($B_0$ and $B_6$ in FIG. 31) each have a narrow angle range. As illustrated in FIG. 31, in directions each having a wide angle range, there can easily be a large difference between (i) an actual edge gradient direction G1 and (ii) an edge gradient direction G2 estimated based on the edge gradient. In such a case, due to the difference between the actual edge gradient direction (G1) and the estimated edge gradient direction ($G_2$), a pixel that should be normally used for interpolation calculation may differ from a pixel that is used for the interpolation calculation that is set based on the estimated edge gradient direction. This may cause such a defect as the occurrence of an error in results of the interpolation calculation. In a case of enlargement, the error becomes noticeable particularly in cases where a zooming ratio is large. Hence, reliability of an edge gradient direction is preferably made low in direction each having a wide angle range by increasing the reliability in directions each having a narrow angle range in a case where the zooming ratio is large.

Hence, the reliability calculating section 74 can store a plurality of lookup tables in advance, and select a lookup table in accordance with the zooming ratio. Specifically, the reliability calculating section 74 includes the lookup table illustrated in FIG. 24 and a lookup table illustrated in FIG. 32. The lookup table illustrated in FIG. 32 is set to have a smaller output value in a case where an angle range $\Delta\theta_\phi$ is larger. Then, the reliability calculating section 74 (i) uses the lookup table of FIG. 24 in a case where the zooming ratio is small (e.g. of two times or less) and (ii) uses the lookup table of FIG. 32 in a case where the zooming ratio is large (e.g. of larger than two times). This allows for an increase in interpolation accuracy.

Likewise, LUT_R and LUT_L can each be set according to the zooming ratio. In such a case, an edge gradient direction having a wider angle range likewise differs, by a larger amount, from an adjacent edge gradient direction. This allows for a decrease in reliability, and therefore makes it possible to restrict the occurrence of the defect.

LUT_C, LUT_R, and LUT_L can each be set as follows: As similar to the case of FIG. 32, first, the LUT_C is set to have a smaller output value in a case where an angle range $\Delta\theta_\phi$ is larger. In addition, as illustrated in FIG. 33, (i) a straight line $L_\phi$, which passes through a center part of an angle range of an edge gradient direction $\phi$ (e.g. $\phi=B_3$ in FIG. 33), that is, which divides the angle range of $\phi$ in half, is drawn and (ii) straight lines $L_{left}$ and $L_{right}$, which are obtained by rotating the $L_\phi$ by $\pm\Delta\theta_T$ around the point of origin (e.g. $\Delta\theta_T=\pi/8$), are drawn. In so doing, edge gradient directions sandwiching the edge gradient direction $\phi$ each include an angle of $\Delta\theta_{RES}$ where the angle range of the edge gradient direction $\phi$ is represented as $\Delta\theta_\phi$. As also illustrated in FIG. 33, the angle range of the edge gradient direction $\phi$ is represented as $\Delta\theta_\phi$, and the angle range sandwiched between (i) each of the straight lines $L_{left}$ and $L_{right}$ and (ii) the angle range of the edge gradient direction $\phi$ is represented as $\Delta\theta_{RES}$. Note, however, that in a case where an angle rotating, by $\pm\Delta\theta_T$, from the center part of the angle range of $\phi$ does not reach the angle range of the edge gradient direction adjacent to $\phi$, $\Delta\theta_{RES}$ is 0.

Then, by use of LUT_C[$\phi$] and information on these angles described above, the values of LUT_R[$\phi$] and LUT_L[$\phi$] are set by use of, for example, the following method of determining the values based on a ratio of $\Delta\theta_{RES}$ to $\Delta\theta_T$:

$$\text{LUT\_R}[\phi]=\text{LUT\_C}[\phi]\times(\Delta\theta_{RES}\div\Delta\theta_T)$$

$$\text{LUT\_L}[\phi]=\text{LUT\_C}[\phi]\times(\Delta\theta_{RES}\div\Delta\theta_T) \quad [\text{Math. 8}]$$

FIG. 34 illustrates an example of values of LUT_R[$\phi$] and LUT_L[$\phi$] in a case where LUT_C[$\phi$] is set as equal to FIG. 32. Note that a method of setting LUT_R and LUT_L is not limited to that described herein, but can be another method.

Then, the reliability calculating section 74 only needs to select the above three lookup tables according to a zooming ratio, such as (i) using the lookup table illustrated in FIG. 27 in a case where the zooming ratio is small (e.g. is of two times or less) and (ii) using the lookup table illustrated in FIG. 34 in a case where the zooming ratio is large (e.g. is of larger than two times).

(Modification of Method by First Setting Section and Second Setting Section Select Selected Pixels)

As has been described, the first setting section 79 selects ND selected pixels from $ND_{GRD}$ selected pixels. In addition, the second setting section 80 selects NP selected pixels from $ND_{GRD}$ selected pixels. The method of such selection is not limited to any particular one.

For example, in a case where (i) a group of input pixels selected by the first setting section 79 is designated as U1 and (ii) a group of input pixels selected by the second setting section 80 is designated as U2, the first setting section 79 and the second setting section 80 make selection so that U1 includes U2, or vice versa. In other words, a group having a smaller number of pixels is completely encompassed in the other group, that is, a group having a larger number of pixels. Alternatively, the first setting section 79 and the second setting section 80 can select the same number of selected pixels.

Alternatively, the first setting section 79 and the second setting section 80 can each select a given number (ND or NP) of selected pixels, which given number is set in order of closeness to an interpolation pixel. In a case where ND=NP=4, four selected pixels surrounding the interpolation pixel are selected. In a case where ND or NP is 5 or greater, it is only necessary to preferentially select selected pixels which are, of selected pixels adjacent to selected pixels that are already selected, close to the interpolation pixel in distance.

Alternatively, it is possible to select, instead of selecting selected pixels in the above order of distance from an interpolation pixel, selected pixels in accordance with their locations in relation to the interpolation pixel. For example, where coordinates of the interpolation pixel are (px, py), it is possible to first select a pixel ([px],[py]) (where [x] is the maximum integer not exceeding x), that is, a pixel located to the upper left of the interpolation pixel. Then, selection is made in order from a lower-left pixel located to the lower left of the interpolation pixel, to an upper-right pixel located to the upper right of the interpolation pixel, to a lower-right pixel located to the lower right of the interpolation pixel, to a pixel located to the left of the upper-left pixel, to a pixel located to the left of the lower-left pixel . . . This order of selection according to the location in relation to the interpolation pixel is set in advance.

Figure 35:
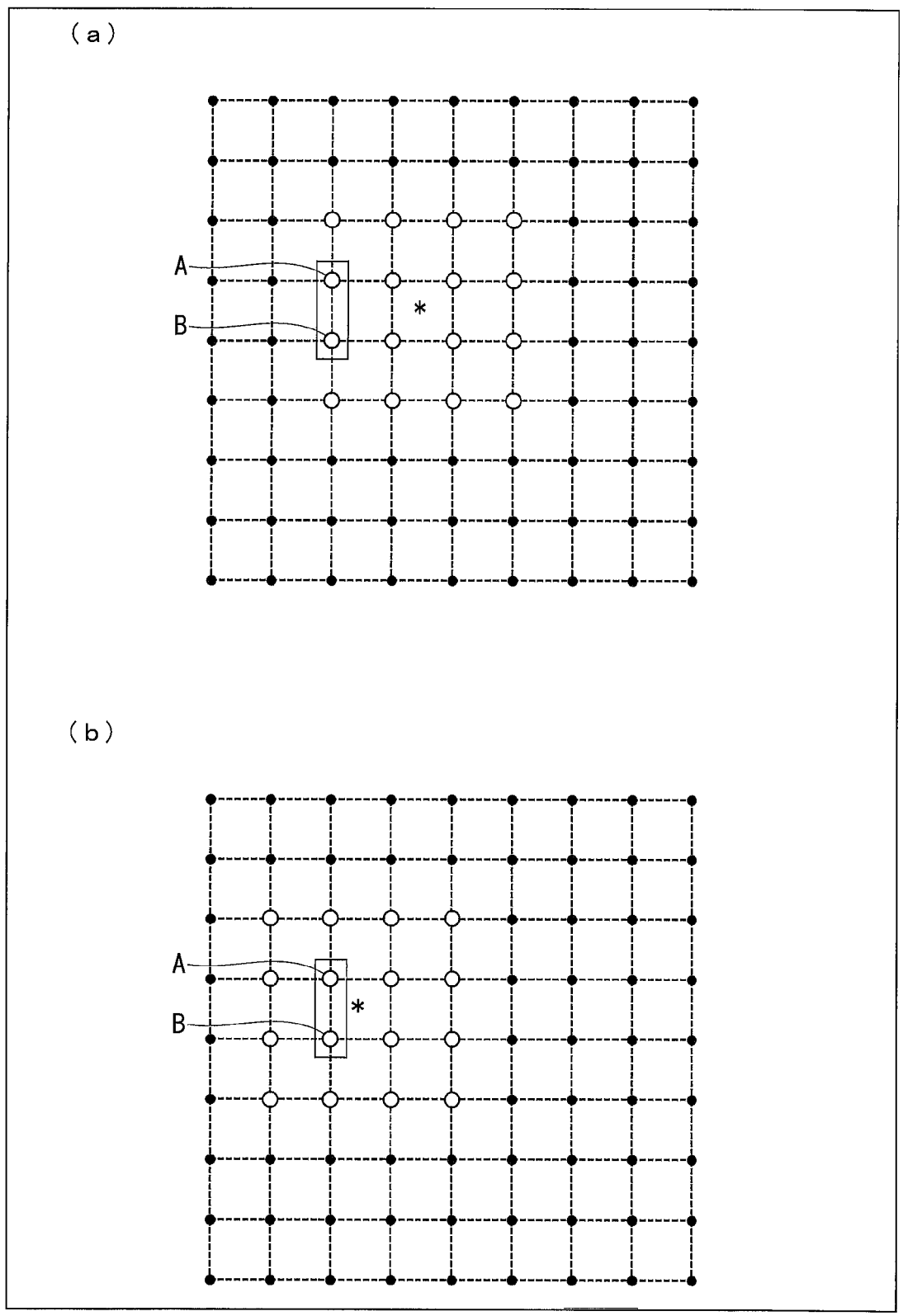
FIG. 35 is a view illustrating selected pixels selected from a reference block.

Assume a case where (i) M=N=4 and (ii) selected pixels are (a) a pixel located to the left of a pixel located to the upper left of an interpolation pixel and (b) a pixel located to the left of a pixel located to the lower left of the interpolation pixel, that is, a case of selected pixels A and B illustrated in (a) of FIG. 35. In this case, it is not possible to determine edge gradients of the selected pixels A and B by use of only a reference block set with respect to an interpolation pixel * illustrated in (a) of FIG. 35. Therefore, as illustrated in (b) of FIG. 35, edge gradients corresponding to the respective selected pixels A and B previously calculated by use of another reference block, which has been shifted to the left by one pixel from the reference block as illustrated in (a) of FIG. 35 are temporarily stored in a buffer. This makes it possible to refer to the edge gradients corresponding to the respective selected pixels A and B even in a case where a reference block is set as illustrated in (a) of FIG. 35.

Embodiment 3

The following description will discuss Embodiment 3 of the present invention. An image processing apparatus in accordance with Embodiment 3 is a monitor (information display). FIG. 36 is a block diagram illustrating a configuration of a monitor 1'. As illustrated in FIG. 36, the monitor 1' is similar in configuration to the television receiver of Embodiment 1 except that the monitor 1' does not include a tuner 7. With the monitor 1' illustrated in FIG. 36 also, it is possible to carry out high quality upscaling of a video by including a video signal processing circuit 21.

FIG. 37 is a view illustrating a multi-display constituted by arranging more than one monitor 1' illustrated in FIG. 36. Even in a case where the multi-display constituted by arranging the plurality of monitors 1' in a horizontal direction and a vertical direction plays back a high-resolution video such as an FHD video, the multi-display is capable of carrying out high quality upscaling of the video since each monitor 1' includes the video signal processing circuit 21.

SUMMARY

An image processing apparatus in accordance with Aspect 1 of the present invention is an image processing apparatus (television receiver 1, monitor 1') configured to enlarge or reduce, in accordance with a set (desired) zooming ratio, inputted image data by calculating an interpolation pixel between input pixels included in the inputted image data, said image processing apparatus comprising: a reference block setting section configured to set a reference block including (containing) the interpolation pixel; an edge gradient direction setting section configured to set an edge gradient direction of the interpolation pixel by use of input pixels located within the reference block; a reference pixel setting section (temporary reference coordinate setting section 65) configured to set four reference pixels to be respective vertices of a quadrangle having two sides perpendicular to the edge gradient direction; a reference pixel value setting section configured such that, in a case where a first reference pixel of the four reference pixels is located outside the reference block, the reference pixel value setting section determines an intersection of a boundary line of the reference block and a side of the quadrangle including the first reference pixel, specifies, as adjacent input pixels, input pixels which are adjacent to the intersection and which are located within the reference block, and evaluates, based on distances between the intersection and the respective adjacent input pixels and based on pixel values of the respective adjacent input pixels, the first reference pixel value and, in a case where the first reference pixel is located inside the reference block, the reference pixel value setting section designates, as a reference pixel value, a pixel value of an input pixel located at the first reference pixel; and an interpolation pixel value calculating section configured to calculate a pixel value of the interpolation pixel by use of the reference pixel values of the respective four reference pixels.

According to the configuration, the density level (pixel value) of the interpolation pixel is calculated by interpolation calculation that uses pixels set in a direction (i.e. edge direction) perpendicular to the edge gradient direction. This allows for enlargement/reduction (zooming) while maintaining smoothness. In addition, even in a case where any set of temporary reference coordinates is located outside the reference block, the density level of the set of the temporary reference coordinates is calculated by interpolation based on input pixels within the reference block. Therefore, the density level of the interpolation pixel can be determined only by use of data on the input pixels within the reference block, and it is therefore possible to increase the speed of a process for calculating the density level of the interpolation pixel. In particular, it is possible to precisely calculate the density level of the interpolation pixel even in a case where line buffers for extracting the data on the input pixels of the reference block cannot be sufficiently secured.

An image processing apparatus in accordance with Aspect 2 of the present invention is an image processing apparatus configured to enlarge or reduce, in accordance with a set zooming ratio, inputted image data by calculating an interpolation pixel between input pixels included in the inputted image data, said image processing apparatus comprising: a reference block setting section configured to set a reference block including the interpolation pixel; an edge gradient direction setting section configured to set an edge gradient direction of the interpolation pixel by use of input pixels located within the reference block; a reference pixel setting section configured to set four reference pixels to be respective vertices of a quadrangle having two sides perpendicular to the edge gradient direction; a reference pixel value setting section configured such that, in a case where a first reference pixel of the four reference pixels is located outside the reference block, the reference pixel value setting section determines an intersection of a boundary line of the reference block and a side of the quadrangle including the first reference pixel, specifies, as adjacent input pixels, input pixels which are adjacent to the intersection and which are located within the reference block, and evaluates, based on distances between the intersection and the respective adjacent input pixels and based on pixel values of the respective adjacent input pixels, the first reference pixel value and, in a case where the first reference pixel is located inside the reference block, the reference pixel value setting section designates, as a reference pixel value, a pixel value of an input pixel located at the first reference pixel; a first interpolating section configured to calculate, by use of the reference pixel values of the respective four reference pixels, a first interpolation value which is a pixel value that depends on the edge gradient direction of the interpolation pixel; a second interpolating section configured to calculate, by use of interpolation that does not depend on the edge gradient direction of the interpolation pixel, a second interpolation value which is a pixel value that does not depend on the edge gradient direction of the interpolation pixel; a reliability calculating section configured to calculate reliability of the edge gradient direction of the interpolation pixel, which edge gradient direction is set by the edge gradient direction setting section; and a combining section configured to calculate a pixel value of the interpolation pixel by determining, based on the reliability, respective weight coefficients with respect to the first interpolation value and the second interpolation value and by adding, with use of the weight coefficients determined, the first interpolation value and the second interpolation value.

According to the configuration also, the density level (pixel value) of the interpolation pixel is calculated in view of the pixels set in a direction (i.e. edge direction) perpendicular to the edge gradient direction. This allows for enlargement/reduction while maintaining smoothness. In addition, the density level of the interpolation pixel can be determined only by use of data on the input pixels within the reference block, and it is therefore possible to increase the speed of a process for calculating the density level of the interpolation pixel.

In addition, the respective weight coefficients for the first interpolation value and the second interpolation value are determined, based on the reliability of the edge gradient direction set by the edge gradient direction setting section. Then, by use of the weight coefficients determined as such, the first interpolation value and the second interpolation value are combined to calculate the density level of the interpolation pixel. This allows the respective weight coefficients of the first interpolation value and the second interpolation value to be changed according to the reliability of the edge gradient direction. For example, in a case where the reliability of the edge gradient direction set by the edge gradient direction setting section is low, it is only necessary to lower the weight coefficient of the first interpolation value. This causes image quality reduction, which occurs due to interpolation dependent on a wrong edge direction, to be prevented.

The image processing apparatus in accordance with Aspect 3 of the present invention can be configured in Aspect 1 or 2 such that the edge gradient direction setting section determines edge gradients of the respective input pixels located within the reference block and sets, based on the edge gradients of the respective input pixels, the edge gradient direction of the interpolation pixel.

According to the configuration, variation in edge gradient directions of input pixels within the reference block is taken into consideration. This makes it possible to set an edge gradient direction which is unsusceptible to noises.

The image processing apparatus in accordance with Aspect 4 of the present invention can be configured in Aspect 1 or 2 such that the edge gradient direction setting section determines, by use of at least one horizontal-direction primary derivative filter and at least one vertical-direction primary derivative filter, edge gradients of the respective input pixels located within the reference block and sets, based on the edge gradients of the respective input pixels, the edge gradient direction of the interpolation pixel.

By determining the edge gradient with the use of the horizontal-direction primary derivative filter and the vertical-direction primary derivative filter, it is possible to precisely set the edge gradient direction within such a limited range as a reference block.

In addition, in a case where a plurality of horizontal-direction primary derivative filters and a plurality of vertical-direction primary derivative filters are used, it is possible to determine an edge gradient even with respect to an edge having a width of a single pixel, such as an edge of a text. This allows the edge gradient direction to be precisely set.

The image processing apparatus in accordance with Aspect 5 of the present invention can be configured in Aspect 2 such that: the edge gradient direction setting section sets, as the edge gradient direction of the interpolation pixel, a single angle region selected from a plurality of angle regions each having a predetermined angle range; and the reliability calculating section determines whether or not each of edge gradient directions of the respective input pixels included within the reference block belongs to a first angle region to which the edge gradient direction of the interpolation pixel belongs and calculates the reliability by use of a first evaluated value that is given by the number of input pixels whose edge gradient direction belong to the first angle region.

The first evaluated value indicates a larger value in a case where the number of the edge gradient directions of input pixels belonging to the first angle region becomes larger. With the configuration, it is possible to take variation in edge gradient directions into consideration by calculating the reliability through comparing (i) the edge gradient direction of the interpolation pixel and (ii) the edge gradient directions of the surrounding input pixels. For example, in a case where an edge gradient direction differing, due to noises or the like, from the actual edge gradient direction is set, it is possible to lower the reliability by acknowledging a possibility that there may be peculiar pixels around the interpolation pixel due to noises or the like.

The image processing apparatus in accordance with Aspect 6 of the present invention can be configured in Aspect 5 such that the reliability calculating section calculates the reliability by determining whether or not each of the edge gradient directions of the respective input pixels included within the reference block belongs to a second angle region adjacent in a clockwise direction to the first angle region and obtaining a second evaluated value that is given by the number of input pixels that belong to the second angle region, determining whether or not each of the edge gradient directions of the respective input pixels included within the reference block belongs to a third angle region adjacent in a counterclockwise direction to the first angle region and obtaining a third evaluated value that is given by the number of input pixels that belong to the third angle region, and adding, to the first evaluated value, a greater one of the second evaluated value and the third evaluated value.

The second evaluated value indicates a larger value in a case where the number of the edge gradient directions of input pixels belonging to the second angle region becomes larger. The third evaluated value indicates a larger value in a case where the number of the edge gradient directions of input pixels belonging to the third angle region becomes larger. According to the configuration, the second and third evaluated values in addition to the first evaluated value are taken into consideration. Therefore, in a case where there are variations in edge gradient directions of the input pixels in both the clockwise direction and the counterclockwise direction to the edge gradient direction of the interpolation pixel, it is possible to take into consideration only a direction having a greater amount of variations. This allows for reduction in reliability in a case where there are edges of a plurality of directions around the interpolation pixel, such as edges of an image of a corner.

The image processing apparatus in accordance with Aspect 7 of the present invention can be configured to further include a display section which displays an image that is obtained by enlarging/reducing the image data.

With the configuration, it is possible to realize an image display apparatus that displays an image that has been subjected to enlargement/reduction by interpolation calculation that takes an edge gradient direction into consideration.

The present invention is not limited to the description of the embodiments, but can be altered in many ways by a person skilled in the art within the scope of the claims. An embodiment derived from a proper combination of technical means disclosed in different embodiments is also encompassed in the technical scope of the present invention. Furthermore, a new technical feature can be obtained by a combination of technical means disclosed in the respective embodiments.

As a final note, each block included in the television receiver 1 or the monitor 1', particularly the scaling sections 61, 61', and 61", can be configured by a hardware logic or by software with the use of a CPU as detailed below.

The object of the present invention can be achieved by a computer (alternatively CPU or MPU) reading and executing the program stored in a storage medium. The storage medium stores, in computer-readable manner, program codes (executable code program, intermediate code program, and source program) of the control program of the television receiver 1 or the monitor 1', which program is software for realizing the aforesaid functions. The storage medium is provided to the television receiver 1 or the monitor 1'.

The storage medium may be, for example, a tape, such as a magnetic tape and a cassette tape; a disk such as a magnetic disk including a Floppy® disk and a hard disk and an optical disk including CD-ROM, MO, MD, DVD, and CD-R; a card, such as an IC card (including a memory card) and an optical card; or a semiconductor memory, such as a mask ROM, EPROM, EEPROM®, and flash ROM.

Further, television receiver 1 or the monitor 1' may be arranged so as to be connectable to a communications network so that the program code is made available via the communications network. The communications network is not to be particularly limited. Examples of the communications network include the Internet, intranet, extranet, LAN, ISDN, VAN, CATV communications network, virtual private network, telephone network, mobile communications network, and satellite communications network. Further, a transmission medium that constitutes the communications network is not particularly limited. Examples of the transmission medium include (i) wired lines such as IEEE 1394, USB, power-line carrier, cable TV lines, telephone lines, and ADSL lines and (ii) wireless connections such as IrDA and remote control using infrared light, Bluetooth®, 802.11, HDR, mobile phone network, satellite connections, and terrestrial digital network. Note that the present invention can be also realized by the program codes in the form of a computer data signal embedded in a carrier wave which is embodied by electronic transmission.

INDUSTRIAL APPLICABILITY

The present invention is applicable to image processing used by, for example, a television.

REFERENCE SIGNS LIST

1 Television receiver (image processing apparatus)
1' Monitor (image processing apparatus)
13 Display section
21 Video signal processing circuit
61, 61', 61" Scaling section
62 Reference block setting section
63, 73, 81 Edge gradient direction setting section
64 Interpolating section
65 Temporary reference coordinate setting section (reference pixel setting section)
66 Reference pixel value setting section
67 Interpolation pixel value calculating section
74, 82 Reliability calculating section
75 First interpolating section
76 Second interpolating section
77 Combining section
78 Edge gradient calculating section
79 First setting section
80, 83 Second setting section

The invention claimed is:

1. An image processing apparatus configured to enlarge or reduce, in accordance with a set zooming ratio, inputted image data by calculating an interpolation pixel between input pixels included in the inputted image data, said image processing apparatus comprising:
a reference block setting section configured to set a reference block including the interpolation pixel;
an edge gradient direction setting section configured to set an edge gradient direction of the interpolation pixel by use of input pixels located within the reference block;
a reference pixel setting section configured to set four reference pixels to be respective vertices of a quadrangle having two sides perpendicular to the edge gradient direction;
a reference pixel value setting section configured such that, in a case where a first reference pixel of the four reference pixels is located outside the reference block, the reference pixel value setting section determines an intersection of a boundary line of the reference block and a side of the quadrangle including the first reference pixel, specifies, as adjacent input pixels, input pixels which are adjacent to the intersection and which are located within the reference block, and evaluates, based on distances between the intersection and the respective adjacent input pixels and based on pixel values of the respective adjacent input pixels, the first reference pixel value and, in a case where the first reference pixel is located inside the reference block, the reference pixel value setting section designates, as a reference pixel value, a pixel value of an input pixel located at the first reference pixel; and
an interpolation pixel value calculating section configured to calculate a pixel value of the interpolation pixel by use of the reference pixel values of the respective four reference pixels.

2. The image processing apparatus as set forth in claim 1, wherein
the edge gradient direction setting section determines edge gradients of the respective input pixels located within the reference block and sets, based on the edge gradients of the respective input pixels, the edge gradient direction of the interpolation pixel.

3. The image processing apparatus as set forth in claim 1, wherein
the edge gradient direction setting section determines, by use of at least one horizontal-direction primary derivative filter and at least one vertical-direction primary derivative filter, edge gradients of the respective input pixels located within the reference block and sets, based on the edge gradients of the respective input pixels, the edge gradient direction of the interpolation pixel.

4. An image processing apparatus configured to enlarge or reduce, in accordance with a set zooming ratio, inputted image data by calculating an interpolation pixel between input pixels included in the inputted image data, said image processing apparatus comprising:
a reference block setting section configured to set a reference block including the interpolation pixel;
an edge gradient direction setting section configured to set an edge gradient direction of the interpolation pixel by use of input pixels located within the reference block;
a reference pixel setting section configured to set four reference pixels to be respective vertices of a quadrangle having two sides perpendicular to the edge gradient direction;
a reference pixel value setting section configured such that, in a case where a first reference pixel of the four reference pixels is located outside the reference block, the reference pixel value setting section determines an intersection of a boundary line of the reference block and a side of the quadrangle including the first reference pixel, specifies, as adjacent input pixels, input pixels which are adjacent to the intersection and which are located within the reference block, and evaluates, based on distances between the intersection and the respective adjacent input pixels and based on pixel values of the respective adjacent input pixels, the first reference pixel value and, in a case where the first reference pixel is located inside the reference block, the reference pixel value setting section designates, as a reference pixel value, a pixel value of an input pixel located at the first reference pixel;

a first interpolating section configured to calculate, by use of the reference pixel values of the respective four reference pixels, a first interpolation value which is a pixel value that depends on the edge gradient direction of the interpolation pixel;

a second interpolating section configured to calculate, by use of interpolation that does not depend on the edge gradient direction of the interpolation pixel, a second interpolation value which is a pixel value that does not depend on the edge gradient direction of the interpolation pixel;

a reliability calculating section configured to calculate reliability of the edge gradient direction of the interpolation pixel, which edge gradient direction is set by the edge gradient direction setting section; and a combining section configured to calculate a pixel value of the interpolation pixel by determining, based on the reliability, respective weight coefficients with respect to the first interpolation value and the second interpolation value and by adding, with use of the weight coefficients determined, the first interpolation value and the second interpolation value.

5. The image processing apparatus as set forth in claim 4, wherein the edge gradient direction setting section determines edge gradients of the respective input pixels located within the reference block and sets, based on the edge gradients of the respective input pixels, the edge gradient direction of the interpolation pixel.

6. The image processing apparatus as set forth in claim 4, wherein the edge gradient direction setting section determines, by use of at least one horizontal-direction primary derivative filter and at least one vertical-direction primary derivative filter, edge gradients of the respective input pixels located within the reference block and sets, based on the edge gradients of the respective input pixels, the edge gradient direction of the interpolation pixel.

7. The image processing apparatus as set forth in claim 4, wherein:

the edge gradient direction setting section sets, as the edge gradient direction of the interpolation pixel, a single angle region selected from a plurality of angle regions each having a predetermined angle range; and the reliability calculating section determines whether or not each of edge gradient directions of the respective input pixels included within the reference block belongs to a first angle region to which the edge gradient direction of the interpolation pixel belongs and calculates the reliability by use of a first evaluated value that is given by the number of input pixels whose edge gradient direction belong to the first angle region.

8. The image processing apparatus as set forth in claim 7, wherein the reliability calculating section calculates the reliability by determining whether or not each of the edge gradient directions of the respective input pixels included within the reference block belongs to a second angle region adjacent in a clockwise direction to the first angle region and obtaining a second evaluated value that is given by the number of input pixels that belong to the second angle region, determining whether or not each of the edge gradient directions of the respective input pixels included within the reference block belongs to a third angle region adjacent in a counterclockwise direction to the first angle region and obtaining a third evaluated value that is given by the number of input pixels that belong to the third angle region, and adding, to the first evaluated value, a greater one of the second evaluated value and the third evaluated value.

9. A computer-readable, non-transitory recording medium in which a program configured to cause a computer to serve as the image processing apparatus recited in claim 1 is stored, the program causing the computer to serve as each of the sections included in the image processing apparatus.

10. A computer-readable, non-transitory recording medium in which a program configured to cause a computer to serve as the image processing apparatus recited in claim 4 is stored, the program causing the computer to serve as each of the sections included in the image processing apparatus.

* * * * *